United States Patent
Nam et al.

(10) Patent No.: US 10,904,782 B2
(45) Date of Patent: Jan. 26, 2021

(54) OUTER-LOOP LINK ADAPTATION WITH MULTIPLE OFFSET PARAMETERS

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/249,613

(22) Filed: Jan. 16, 2019

(65) Prior Publication Data

US 2019/0223033 A1 Jul. 18, 2019

Related U.S. Application Data

(60) Provisional application No. 62/618,854, filed on Jan. 18, 2018.

(51) Int. Cl.
    *H04W 24/08* (2009.01)
    *H04W 72/08* (2009.01)
    (Continued)

(52) U.S. Cl.
    CPC .......... *H04W 24/08* (2013.01); *H04B 7/0404* (2013.01); *H04B 7/0689* (2013.01);
    (Continued)

(58) Field of Classification Search
    CPC ... H04W 24/08; H04W 24/10; H04W 72/085; H04B 7/0805; H04B 7/0404;
    (Continued)

(56) References Cited

U.S. PATENT DOCUMENTS

2014/0301297 A1    10/2014  Geirhofer et al.
2016/0227541 A1*   8/2016   Damnjanovic ......... H04L 5/001
(Continued)

FOREIGN PATENT DOCUMENTS

WO    WO-2017074488 A1    5/2017

OTHER PUBLICATIONS

Intel Corporation: "On Codebook Based UL Transmission", 3GPP Draft; R1-1712537 on Codebook Based UL Transmission, 3rd Generation Partnership Project (3GPP), Mobile Competence Centre; 650, Route Des Lucioles; F06921 Sophia-Antipolis Cedex; France, vol. RAN WG1, No. Praguet P.R. Czechia; Aug. 21, 2017-Aug. 25, 2017 Aug. 20, 2017, XP051315353, Retrieved from the Internet: URL:http://www.3gpp.org/ftp/Meetings_3GPP_SYNC/RAN1/Docs/ [retrieved on Aug. 20, 2017] Section 1 "Introduction" and section 2.1, "UE antenna Structure", 6 pages.

(Continued)

*Primary Examiner* — Pao Sinkantarakorn
*Assistant Examiner* — Kabir U Jahangir
(74) *Attorney, Agent, or Firm* — Linda G. Gunderson; Holland & Hart LLP

(57) ABSTRACT

Methods, systems, and devices for wireless communications are described. A wireless device, such as user equipment (UE), may transmit, to a base station, UE profile information where the UE profile information provides an indication of a plurality of modes of operation supported by the UE, each of the plurality of modes of operation corresponding to a reception configuration using one or more of a plurality of antenna panels of the UE and one or more of a plurality of digital baseband chains of the UE, In some cases, the UE may identify a mode of operation from the plurality of modes of operation for communicating with the base station. The UE may then communicate with the base station based in part on the identified mode of operation.

28 Claims, 15 Drawing Sheets

(51) Int. Cl.
  *H04L 1/18*       (2006.01)
  *H04B 7/08*       (2006.01)
  *H04L 1/00*       (2006.01)
  *H04B 7/0404*     (2017.01)
  *H04B 7/06*       (2006.01)
  *H04W 24/10*      (2009.01)

(52) U.S. Cl.
  CPC ......... *H04B 7/0805* (2013.01); *H04L 1/0015* (2013.01); *H04L 1/0023* (2013.01); *H04L 1/0036* (2013.01); *H04L 1/1812* (2013.01); *H04W 72/085* (2013.01); *H04W 24/10* (2013.01)

(58) Field of Classification Search
  CPC ... H04B 7/0689; H04L 1/0015; H04L 1/0023; H04L 1/0036; H04L 1/1812
  See application file for complete search history.

(56) References Cited

U.S. PATENT DOCUMENTS

| 2018/0234881 | A1* | 8/2018  | Hosseini | H04L 1/1887 |
| 2018/0309526 | A1* | 10/2018 | Zhang    | H04B 7/0617 |
| 2019/0159219 | A1* | 5/2019  | Hosseini | H04W 72/10  |

OTHER PUBLICATIONS

International Search Report and Written Opinion—PCT/US2019/014083—ISA/EPO—dated May 2, 2019.

\* cited by examiner

OUTER-LOOP LINK ADAPTATION WITH MULTIPLE OFFSET PARAMETERS

CROSS REFERENCES

The present Application for Patent claims the benefit of U.S. Provisional Patent Application No. 62/618,854 by Nam et al., entitled "OUTER-LOOP LINK ADAPTATION WITH MULTIPLE OFFSET PARAMETERS," filed Jan. 18, 2018, assigned to the assignee hereof, and expressly incorporated herein.

BACKGROUND

The following relates generally to wireless communication, and more specifically to outer-loop link adaptation with multiple offset parameters.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communication systems, such as those operating in millimeter-wave (mmW) spectrum (e.g., above 6 GHz), beamforming may be deployed to combat attenuation and high path losses, which may impact the link budget of communications. A UE and base station operating in mmW spectrum may utilize beamforming techniques to increase the strength of wireless signals in particular directions to address the additional attenuation. In some mmW wireless communication systems, beam management and channel state information (CSI) acquisition may be performed separately. For instance, beam management for analog beam forming and panel selection may be performed over a relatively long-term scale, whereas CSI acquisition for digital beam forming/precoding may be performed over a short term, and for a given beam.

In some cases, beam/panel changes may be activated for a short duration, for example, due to a measurement gap for monitoring a neighboring cell, or for power saving. In some aspects, the beam/panel change may be performed autonomously at the UE, or in response to a command transmitted from the network. In some cases, sporadic reconfiguration of beams/panels may result in performance loss. While hybrid automatic repeat request (HARM) and/or outer-loop link adaptation may partially compensate for performance losses, there may be additional delays associated with them.

SUMMARY

The described techniques relate to improved methods, systems, devices, or apparatuses that support outer-loop link adaptation with multiple offset parameters. In some cases, an outer-loop link adaptation (OLLA) algorithm may be implemented in a wireless communication system in order to select an appropriate modulation and coding scheme (MCS) according to current channel conditions. In some cases, OLLA may be used to adaptively modify the mapping from signal-to-noise ratio (SNR) to a channel quality indicator (CQI). Thus, the OLLA may modify the measured SNR by an offset parameter, based in part on if data packets have been received correctly or not. For instance, the user equipment (UE) may transmit acknowledgement or negative acknowledgement signaling to the base station in response to data transmissions. In some cases, OLLA may enable the base station to adjust the average block error rate (BLER) to a target. In some cases, the network or base station may define multiple offset parameters $\Delta$ (i), and assign them to each possible mode of UE beam/panel operations. For instance, $\Delta$ (0) may refer to the offset parameter for the reference mode of operation (i.e., when a UE receives data through two chains from a panel), $\Delta$ (1) may be associated with the first mode of operation (i.e., when a UE utilizes one chain for data reception from the serving cell, and the other chain is off or utilized for measuring neighboring cells). In some cases, $\Delta$ (0) may be the offset between the CQI and the actual scheduled spectral efficiency that can achieve the target performance (e.g., target BLER) in the reference mode of operation. In some aspects, the CQI may be acquired based on CSI feedback received from the UE. Alternatively, the CQI may be measured by the base station when channel reciprocity holds.

In some examples, the $\Delta$ (0) may be trained (or updated) by an OLLA algorithm based on acknowledgement/non-acknowledgement feedback received from the UE. In some cases, $\Delta$ (1) may be a relative offset to the reference scenario. Further, while operating in mode 1 (i.e., when only one chain is used), an offset of $\Delta$ (0)+$\Delta$ (1) may be applied by the base station while scheduling downlink data transmissions. Similar to the case for operating in reference mode, $\Delta$ (1) may be trained by OLLA, following starting from a default value. In some cases, OLLA for mode 1 may be separate and distinct from OLLA for mode 0, and the default value may be selected conservatively, for instance, to minimize initial performance impact. Thus, broadly, the present disclosure relates to maintaining different offset parameters and CSI processes for each mode of operation, and scheduling downlink data transmissions based on the selected mode of operation.

A method of wireless communication is described. The method may include transmitting, to a base station, UE profile information, where the UE profile information provides an indication of a plurality of modes of operation supported by the UE, each of the plurality of modes of operation corresponding to a reception configuration using one or more of a plurality of antenna panels of the UE and one or more of a plurality of digital baseband chains of the UE, identifying a mode of operation from the plurality of modes of operation for communicating with the base station, and communicating with the base station based in part on the identified mode of operation.

An apparatus for wireless communication is described. The apparatus may include means for transmitting, to a base station, UE profile information, where the UE profile information provides an indication of a plurality of modes of operation supported by the UE, each of the plurality of modes of operation corresponding to a reception configuration using one or more of a plurality of antenna panels of the UE and one or more of a plurality of digital baseband chains of the UE, means for identifying a mode of operation from the plurality of modes of operation for communicating with the base station, and means for communicating with the base station based in part on the identified mode of operation.

Another apparatus for wireless communication is described. The apparatus may include a processor, memory in electronic communication with the processor, and instructions stored in the memory. The instructions may be operable to cause the processor to transmit, to a base station, UE profile information, where the UE profile information provides an indication of a plurality of modes of operation supported by the UE, each of the plurality of modes of operation corresponding to a reception configuration using one or more of a plurality of antenna panels of the UE and one or more of a plurality of digital baseband chains of the UE, identify a mode of operation from the plurality of modes of operation for communicating with the base station, and communicate with the base station based in part on the identified mode of operation.

A non-transitory computer-readable medium for wireless communication is described. The non-transitory computer-readable medium may include instructions operable to cause a processor to transmit, to a base station, UE profile information, where the UE profile information provides an indication of a plurality of modes of operation supported by the UE, each of the plurality of modes of operation corresponding to a reception configuration using one or more of a plurality of antenna panels of the UE and one or more of a plurality of digital baseband chains of the UE, identify a mode of operation from the plurality of modes of operation for communicating with the base station, and communicate with the base station based in part on the identified mode of operation.

In some examples of the method, apparatus, and non-transitory computer-readable medium described herein, the communicating comprises receiving a downlink data transmission from the base station.

Some examples of the method, apparatus, and non-transitory computer-readable medium described herein may further include processes, features, means, or instructions for transmitting, to the base station, acknowledgement/not-acknowledgement feedback for the downlink data transmission.

Some examples of the method, apparatus, and non-transitory computer-readable medium described herein may further include processes, features, means, or instructions for transmitting periodic or aperiodic channel state feedback associated with one or more of the plurality of modes of operation.

Some examples of the method, apparatus, and non-transitory computer-readable medium described herein may further include processes, features, means, or instructions for receiving a channel state feedback configuration associating each of the plurality of modes of operation with one of a plurality of channel state information (CSI) processes.

In some examples of the method, apparatus, and non-transitory computer-readable medium described herein, the transmitting the periodic or aperiodic channel state feedback comprises measuring CSI for the identified mode of operation and assigning the measured CSI to the CSI process associated with the identified mode of operation.

Some examples of the method, apparatus, and non-transitory computer-readable medium described herein may further include processes, features, means, or instructions for identifying the mode of operation from the plurality of modes of operation may be based at least in part on receiving, from the base station, control information, the control information based in part on the UE profile information.

In some examples of the method, apparatus, and non-transitory computer-readable medium described herein, the control information may be one or more of downlink control information (DCI), a radio resource control (RRC) message, or a medium access control (MAC)-control element (CE).

Some examples of the method, apparatus, and non-transitory computer-readable medium described herein may further include processes, features, means, or instructions for identifying the mode of operation from the plurality of modes of operation, where identifying the mode of operation may be based on identifying a predetermined event corresponding to the identified mode of operation.

Some examples of the method, apparatus, and non-transitory computer-readable medium described herein may further include processes, features, means, or instructions for identifying the mode of operation from the plurality of modes of operation, where transmitting the UE profile information may include transmitting UE capability reporting, uplink control information (UCI), a radio resource control (RRC) message, or a medium access control (MAC)-control element (CE) message.

Some examples of the method, apparatus, and non-transitory computer-readable medium described herein may further include processes, features, means, or instructions for identifying the mode of operation from the plurality of modes of operation, where identifying the mode of operation may be based on a power state of the UE.

A method of wireless communication is described. The method may include receiving, from a UE, UE profile information, where the UE profile information provides an indication of a plurality of modes of operation supported by the UE, receiving, from the UE, an indication of channel quality, determining spectral efficiency offset parameters for each of the plurality of modes of operation based at least in part on the received UE profile information, the indicated channel quality, or a combination thereof, identifying a mode of operation from the plurality of modes of operation for communicating with the UE, and communicating with the UE based at least in part on the identified mode of operation and the determined spectral efficiency offset parameters.

An apparatus for wireless communication is described. The apparatus may include means for receiving, from a UE, UE profile information, where the UE profile information provides an indication of a plurality of modes of operation supported by the UE, means for receiving, from the UE, an indication of channel quality, means for determining spectral efficiency offset parameters for each of the plurality of modes of operation based at least in part on the received UE profile information, the indicated channel quality, or a combination thereof, means for identifying a mode of operation from the plurality of modes of operation for communicating with the UE, and means for communicating with the UE based at least in part on the identified mode of operation and the determined spectral efficiency offset parameters.

Another apparatus for wireless communication is described. The apparatus may include a processor, memory in electronic communication with the processor, and instructions stored in the memory. The instructions may be operable to cause the processor to receive, from a UE, UE profile information, where the UE profile information provides an indication of a plurality of modes of operation supported by the UE, receive, from the UE, an indication of channel quality, determine spectral efficiency offset parameters for each of the plurality of modes of operation based at least in part on the received UE profile information, the indicated channel quality, or a combination thereof, identify a mode of operation from the plurality of modes of operation for communicating with the UE, and communicate with the UE based at least in part on the identified mode of operation and the determined spectral efficiency offset parameters.

A non-transitory computer-readable medium for wireless communication is described. The non-transitory computer-readable medium may include instructions operable to cause a processor to receive, from a UE, UE profile information, where the UE profile information provides an indication of a plurality of modes of operation supported by the UE, receive, from the UE, an indication of channel quality, determine spectral efficiency offset parameters for each of the plurality of modes of operation based at least in part on the received UE profile information, the indicated channel quality, or a combination thereof, identify a mode of operation from the plurality of modes of operation for communicating with the UE, and communicate with the UE based at least in part on the identified mode of operation and the determined spectral efficiency offset parameters.

In some examples of the method, apparatus, and non-transitory computer-readable medium described herein, the plurality of modes of operation correspond to reception configurations for the communicating using one or more of a plurality of antenna panels of the UE and one or more of a plurality of digital baseband chains of the UE.

In some examples of the method, apparatus, and non-transitory computer-readable medium described herein, the plurality of modes of operation comprises at least a first, reference mode of operation and a second mode of operation.

In some examples of the method, apparatus, and non-transitory computer-readable medium described herein, the reference mode of operation may be associated with a first spectral efficiency offset parameter, and where the first spectral efficiency offset parameter may be a difference between an acquired CQI and a target performance spectral efficiency for the reference mode of operation.

In some examples of the method, apparatus, and non-transitory computer-readable medium described herein, the second mode of operation may be associated with a second spectral efficiency offset parameter, and where spectral efficiency in the second mode of operation may be based at least in part on the first spectral efficiency offset parameter and the second spectral efficiency offset parameter.

Some examples of the method, apparatus, and non-transitory computer-readable medium described herein may further include processes, features, means, or instructions for communicating with the UE comprises scheduling a data transmission, indicating a CSI process, or both.

Some examples of the method, apparatus, and non-transitory computer-readable medium described herein may further include processes, features, means, or instructions for receiving, from the UE, acknowledgement/not-acknowledgement feedback associated with the communicating.

Some examples of the method, apparatus, and non-transitory computer-readable medium described herein may further include processes, features, means, or instructions for updating the spectral efficiency offset parameter for the identified mode of operation based at least in part on the acknowledgement/not-acknowledgement feedback.

Some examples of the method, apparatus, and non-transitory computer-readable medium described herein may further include processes, features, means, or instructions for receiving, from the UE, UE assistance information for identifying the mode of operation from the plurality of modes of operation or a CSI feedback for the identified mode of operation.

In some examples of the method, apparatus, and non-transitory computer-readable medium described herein, scheduling the data transmission for the identified mode of operation may further include transmitting downlink data to the UE based in part on the received UE assistance information or CSI feedback for the identified mode of operation.

DETAILED DESCRIPTION

Figure 1:
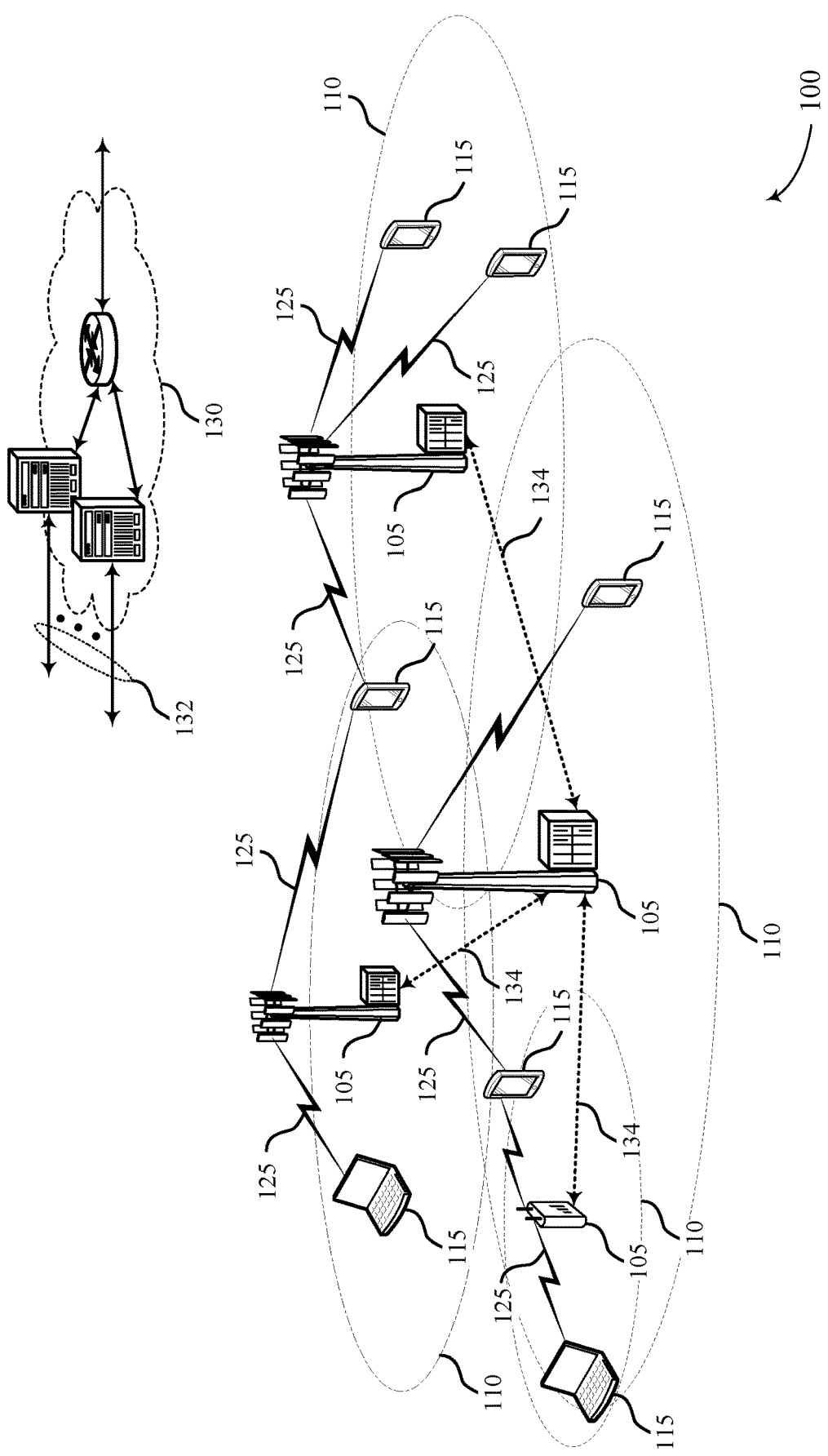
FIG. 1 illustrates an example of a system for wireless communication in accordance with aspects of the present disclosure.

In some wireless communication systems, such as those operating in millimeter-wave (mmW) spectrum (e.g., above 6 GHz), beamforming may be deployed to combat attenuation and high path losses, which may impact the link budget of communications. In some cases, wireless devices such as a UE may have multiple antenna panels or subarrays. Further, propagation characteristics of signals may be highly directional and vulnerable to blocking while operating in high frequencies (e.g., mmW spectrum), and deploying multiple antenna panels pointed in different directions may serve to optimize communications.

In some cases, mmW communication systems may deploy hybrid beamforming techniques, to decrease implementation complexity. For instance, hybrid beamforming techniques may allow beamforming to be partitioned between the digital and radio frequency (RF) domains. In some cases, an antenna panel or subarray may be composed of multiple antenna elements. In hybrid beamforming, those antenna elements, also referred to as RF chains, may be combined or split in the analog domain, and connected to a smaller set of intermediate frequency (IF)/baseband (BB) chains in the digital domain. In some cases, due to hardware constraints and/or implementation complexity, all of the antenna panels/subarrays of a UE may not be simultaneously activated. In such cases, a subset of the subarrays may be selected, and baseband chains may be routed and switched to the selected subarrays under certain hardware constraints.

In some cases, each antenna panel may include one or more interface ports (e.g., horizontal (H) and vertical (V) polarization ports). Further, the one or more digital chains (e.g., H-chain and V-chain) from the baseband unit may be connected to the analog frontend, under some constraints. For instance, the H-chain may be connected to either the H-polarization port of the first panel or the second panel, and the V-chain may be connected to either the V-polarization port of the first panel or the second panel. Thus, in some cases, one panel may be blocked or have low gain by pointing in an opposite direction from a transmission reception point (TRP), or, one chain may be utilized by the UE for data reception from a serving cell/TP, while the other chain may be utilized by the UE for monitoring a neighboring cell or other TRPs.

In some cases, beam/panel changes may be activated for a short duration, for example, due to a measurement gap for monitoring a neighboring cell, or for power saving. In some aspects, the beam/panel change may be performed autonomously at the UE, or in response to a command transmitted from the network. In some examples, a UE normally receiving data through one or more baseband chains (e.g., H-chain and V-chain) from a first panel may intermittently change the direction of the analog beam of the H-chain or V-chain, or switch the V-chain to its second panel, in order to monitor a neighboring cell. In such cases, the UE may maintain the H-chain for data reception from the serving cell, ensuring continuity of data reception. In some cases, a UE utilizing both baseband chains for data reception for a given beam/panel may be referred to as operating in a reference mode. In some cases, CSI may only be measured assuming a reference mode of operation. In some cases, downlink data transmission may be scheduled based on the CSI measured in the reference mode. Further, sporadic reconfiguration of beams/panels may result in performance loss. For instance, the current mode of operation may be different from the reference mode of operation, for which the CSI measurement and scheduling of downlink data transmission may have been performed. In some cases, hybrid automatic repeat request (HARQ) and/or outer-loop link adaptation may partially compensate for performance losses, but may result in additional delays.

In some cases, link adaptation (e.g., OLLA) may be implemented in wireless communication systems in order to select an appropriate modulation and coding scheme (MCS) according to current channel conditions. For instance, through a channel quality indicator (CQI), the receiver (i.e., UE) may suggest an appropriate MCS to the base station. In some cases, the OLLA may modify the measured SNR by an offset parameter, based in part on if data packets have been received correctly or not. For instance, the UE may transmit acknowledgement (ACK) or negative acknowledgement (NACK) feedback to the base station to convey the same. In some cases, OLLA may enable the base station to adjust the average block error rate (BLER) to a target. In some cases, the network or base station may define multiple offset parameters $\Delta$ (i), and assign them to each possible mode of beam/panel operations. For instance, $\Delta$ (0) may refer to the offset parameter for the reference mode of operation (i.e., when a UE receives data through two chains from a panel), $\Delta$ (1) may be associated with the first mode of operation (i.e., when a UE utilizes one chain for data reception from the serving cell, and the other chain is off or utilized for measuring neighboring cells). In some cases, $\Delta$ (0) may be the offset between the CQI and the actual scheduled spectral efficiency that can achieve the target performance in the reference mode of operation. In some aspects, the CQI may be acquired based on CSI feedback received from the UE. Alternatively, the CQI may be measured by the base station when channel reciprocity holds. In some examples, the $\Delta$ (0) may be trained (or updated) by an OLLA algorithm based on HARQ feedbacks received from the UE. In some cases, $\Delta$ (1) may be a relative offset to the reference scenario. Further, while operating in mode 1 (i.e., when only one chain is used), an offset of $\Delta$ (0)+$\Delta$ (1) may be applied by the base station while scheduling downlink data transmissions. Similar to the case for operating in reference mode, $\Delta$ (1) may be trained by OLLA, following starting from a default value. In some cases, OLLA for mode 1 may be separate and distinct from OLLA for mode 0, and the default value may be selected conservatively, for instance, to minimize initial performance impact.

In some cases, multiple CSIs may be measured at the UE based on different beam/panel reception hypotheses (i.e., different modes of operation). For instance, CSI measured for different hypotheses may be assigned to different CSI processes. Thus, CSI measured for the reference mode (mode 0) may be assigned to a first CSI process, CSI measured for mode 1 may be assigned to a second CSI process, and so on. In some cases, depending on the current mode of operation, the scheduler at the base station may utilize the CSI report corresponding to the current mode of operation for downlink data scheduling. For example, during the measurement gap (i.e., when mode 1 is selected), the scheduling may be based on the channel state feedback (CSF) for mode 1.

It should be noted that the number of modes of operation may be larger than two, and the two modes of operation described here are merely examples, and not to be construed as the only implementation of the present disclosure. In some aspects, the number of modes of operation may depend on the number of panels/subarrays and digital baseband chains deployed at the UE. In some cases, the network or base station may select a mode of operation based on information indicating a capability or profile of the UE (e.g., an indication of the number of modes of operation supported by the UE), and indicate the same to the UE via downlink signaling. The information indicating the capability or profile of the UE may be provided in a UE profile report or UE assistance information. In some cases, the capability or profile of the UE may be conveyed via UE capability reporting, uplink control information (UCI), radio resource control (RRC) signaling, or medium access control (MAC) control element (CE) signaling. In some cases, the downlink signaling may be conveyed via RRC signaling, MAC-CE signaling, or downlink control information (DCI) signaling. In other cases, the UE may select a mode of operation and notify the network or base station via uplink signaling (e.g., UCI). In some cases, the mode of operation may be selected based on a predetermined event (e.g., a measurement gap to measure a neighboring cell).

Aspects of the disclosure are initially described in the context of a wireless communications system. Aspects of the disclosure are further illustrated by and described with respect to modes of operation diagrams, apparatus diagrams, system diagrams, and flowcharts that relate to outer-loop link adaptation with multiple offset parameters.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In wireless communication system 100, an OLLA algorithm may be implemented in order to select an appropriate MCS according to current channel conditions. In some cases, OLLA may be used to adaptively modify the mapping from SNR or CQI to MCS. Thus, the OLLA may modify the measured SNR or received CQI by an offset parameter, based in part on if data packets have been received correctly or not. For instance, a UE 115 may transmit ACK/NACK feedback to a base station 105 in response to data transmissions. In some cases, OLLA may enable the base station 105 to adjust the average BLER to a target. In some cases, the base station 105 may define multiple offset parameters Δ (i), and assign them to each possible mode of beam/panel operations at UE 115. For instance, Δ (0) may refer to the offset parameter for the reference mode (e.g., mode 0) of operation (i.e., when the UE 115 receives data through two chains from a panel), Δ (1) may be associated with a different mode (e.g., mode 1) of operation (i.e., when UE 115 utilizes one chain for data reception from the serving cell, and the other chain is off or utilized for measuring neighboring cells). In some cases, Δ (0) may be the offset between the CQI and the actual scheduled spectral efficiency that can achieve the target performance (e.g., target BLER) in the reference mode of operation. In some aspects, the CQI may be acquired based on CSI feedback received from the UE 115. Alternatively, the CQI may be measured by the base station 105 when channel reciprocity holds.

In some examples, the Δ (0) may be trained (or updated) by an OLLA algorithm based on acknowledgement/non-acknowledgement feedbacks received from the UE 115. In some cases, Δ (1) may be a relative offset to the reference scenario. Further, while operating in mode 1 (i.e., when only one chain is used), an offset of Δ (0)+Δ (1) may be applied by the base station 105 while scheduling downlink data transmissions. Similar to the case for operating in the reference mode, Δ (1) may be trained by OLLA, following starting from a default value. In some cases, OLLA for mode 1 may be separate and distinct from OLLA for mode 0, and the default value may be selected conservatively, for instance, to minimize initial performance impact. Thus, different offset parameters and CSI processes may be associated with each mode of operation, and base station 105 may schedule downlink data transmissions with spectral efficiency based on the selected mode of operation.

Figure 2:
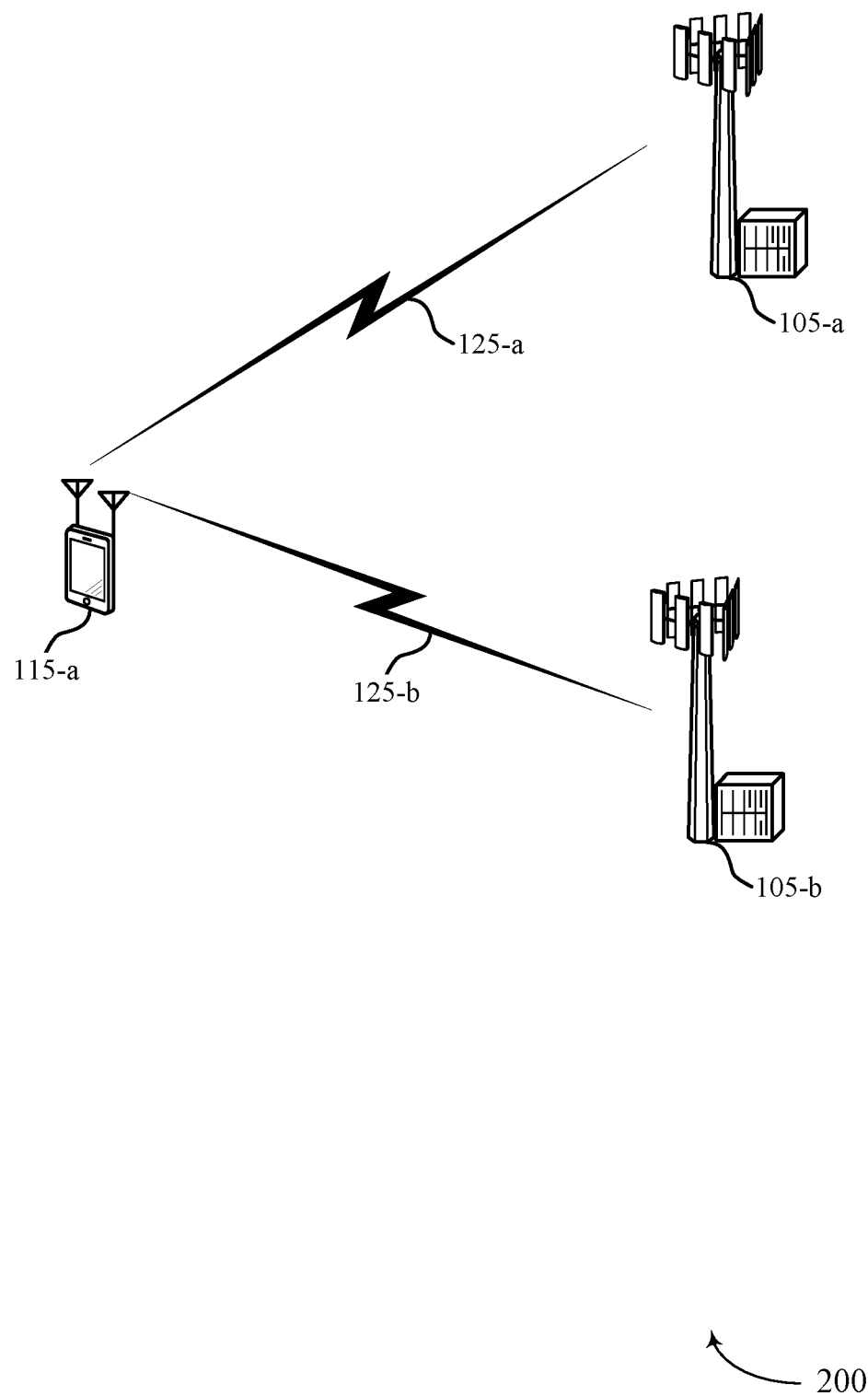
FIG. 2 illustrates an example of a wireless communication system in accordance with aspects of the present disclosure.

FIG. 2 illustrates an example of a wireless communication system 200 that supports outer-loop link adaptation with multiple offset parameters in accordance with various aspects of the present disclosure. In some examples, wireless communication system 200 may implement aspects of wireless communication system 100. The wireless communication system 200 may include a UE 115-a and base stations 105-a and 105-b, which may be examples of the UE 115 and base station 105 described with reference to FIG. 1. The UE 115-a and base stations 105-a and 105-b may communicate using directional beams (not shown) over wireless communication links 125-a and 125-b, respectively, and may operate using mmW spectrum, for example. In some cases, base station 105-a may be referred to as the serving cell, and base station 105-b may be referred to as the neighboring cell.

As discussed above, when operating using mmW frequencies, the base stations 105-a and 105-b, and/or the UE 115-a may utilize beamforming techniques to increase the strength of wireless signals subject to high attenuation and path loss. For example, base stations 105-a and/or 105-b may transmit a plurality of downlink beamformed signals that carry data and/or control information. In some cases, wireless communication system 200 may deploy hybrid beamforming techniques, to decrease implementation complexity.

In wireless communications system 200, beam management and CSI acquisition may be performed separately. For instance, beam management for analog beam forming and panel selection may be performed over a relatively long-term scale, whereas CSI acquisition for digital beam forming/precoding may be performed over a short term, and for a given beam. In some cases, beam/panel changes may be activated for a short duration, for example, due to a measurement gap for monitoring neighboring cell (i.e., base station 105-b), or for power saving, for example, based on a power state of UE 115-a. For example, the power state or thermal condition of UE 115-a may be indicated (e.g., in UE assistance information) to base station 105-a and/or 105-b. The UE assistance information may be used by base stations 105-a and/or 105-b to identify a mode of operation for UE 115-a and may include a power state of UE 115-a, a thermal condition of UE 115-a, or a recommended mode of operation.

In some aspects, the beam/panel change may be performed autonomously at the UE 115-a, or in response to a command transmitted from the network. In some cases, the command may be control information transmitted via DCI, RRC, or MAC-CE signaling. In some examples, UE 115-a, which may normally receive data through one or more baseband chains (e.g., H-chain and V-chain) from a first panel, may intermittently change the direction of the analog beam of the H-chain or V-chain, or switch the V-chain to its second panel, in order to monitor base station 105-b. In such cases, the UE 115-a may maintain the H-chain for data reception from the serving cell, ensuring continuity of data reception. In some cases, UE 115-a utilizing both baseband chains for data reception for a given beam/panel may be referred to as operating in reference mode. In some cases, CSI may only be measured assuming a reference mode of operation, and thus downlink transmissions may be scheduled assuming the CSI measured in the reference mode. In some cases, sporadic reconfiguration of beams/panels (e.g., from a reference mode of operation to a different mode of operation) may result in performance loss. While HARQ and/or traditional outer-loop link adaptation may partially compensate for performance losses, they may lead to additional delays.

In some cases, link adaptation may be implemented in wireless communication system 200 in order to select an appropriate MCS according to current channel conditions. For instance, through CQI feedback, the receiver (i.e., UE 115-a) may suggest an appropriate MCS to the base station 105-a. In some cases, in order to overcome non-idealities associated with traditional link adaptation, an OLLA algorithm may be used to adaptively modify the mapping from SNR or CQI to MCS of data transmissions. Thus, the OLLA may modify the measured SNR or received CQI by an offset parameter, based in part on if data packets have been received correctly or not (e.g., acknowledgement or negative acknowledgement transmitted from UE 115-a). In some cases, OLLA may enable the base station 105-a to adjust the average BLER to a target.

In some cases, base station 105-a may define multiple offset parameters Δ (i), and assign them to each possible mode of beam/panel operations. For instance, Δ (0) may refer to the offset parameter for the reference mode (e.g., mode 0) of operation (i.e., when UE 115-a receives data through two chains from a panel), Δ (1) may be associated with a different mode (e.g., mode 1) of operation (i.e., when UE 115-a utilizes one chain for data reception from the serving cell, and the other chain is off or utilized for measuring neighboring base station 105-b). In some cases, Δ (0) may be the offset between the CQI and the actual scheduled spectral efficiency that can achieve the target performed in the reference mode of operation. In some aspects, the CQI may be acquired based on CSI feedback received from the UE 115-*a*. Alternatively, the CQI may be measured by the base station 105-*a* when channel reciprocity holds. In some examples, the Δ (0) may be trained (or updated) by an OLLA algorithm based on HARQ feedbacks received from the UE 115-*a*. In some cases, Δ (1) may be a relative offset to the reference scenario. Further, while operating in mode 1 (i.e., when only one chain is used), an offset of Δ (0)+Δ (1) may be applied by the base station 105-*a* while scheduling downlink data transmissions. Similar to the case for operating in reference mode, Δ (1) may be trained by OLLA, following starting from a default value. In some cases, OLLA for mode 1 may be separate and distinct from OLLA for mode 0, and the default value may be selected conservatively, for instance, to minimize initial performance impact.

Accordingly to various aspects of the present disclosure, UE 115-*a* may maintain multiple reception configurations, for example, UE 115-*a* may measure CSI concurrently for more than one mode of operation (e.g., more than one different antenna panel configuration). In some cases, multiple CSIs may be measured at the UE 115-*a* based on different reception configurations (e.g., modes of operation, beam/panel reception hypotheses). For instance, CSI measured for different reception configurations may be assigned to different CSI processes. Thus, CSI measured for the reference mode (mode 0) may be assigned to a first CSI process, CSI measured for mode 1 may be assigned to a second CSI process, and so on. In some cases, the UE 115-*a* may provide periodic channel state feedback (CSF) for certain modes (e.g., reference mode), while providing aperiodic CSFs for other modes (e.g., mode 1). In such cases, the aperiodic CSF may be triggered one or more slots (e.g., X slots) before the corresponding mode is selected (e.g., before a measurement gap where mode 1 is used). In some cases, X may be determined by dynamic CSF offset restrictions provided by the base station 105-*a*. For instance, the base station 105-*a* may signal the UE 115-*a* using RRC, MAC-CE, or DCI. In some cases, depending on the current mode of operation, the scheduler at the base station 105-*a* may utilize the CSI report corresponding to the current mode of operation for downlink data scheduling. For example, during the measurement gap (i.e., when mode 1 is selected), the scheduling may be based on the channel state feedback (CSF) for mode 1. In such cases, only a single outer loop may be maintained by the UE.

In some other cases, the UE 115-*a* may transmit information related to a capability or a profile of the UE indicating which modes of operation are supported by the UE 115-*a*. For instance, the UE 115-*a* may indicate that it supports both mode 0 (i.e., a reference mode) and mode 1 (e.g., mode 0 and mode 1 are configured for being supported concurrently). As previously described, mode 0 may refer to the case when the UE 115-*a* receives data or control information using two chains, whereas mode 1 may refer to the case when the UE 115-*a* receives data/control information using a single chain. In some cases, each mode of operation may be associated with a specific operation. For instance, mode 0 may be associated with reception of data/control from the serving cell, whereas mode 1 may be associated with reception of data/control from the serving cell, as well as measurement of neighboring base station 105-*b*. It should be noted that the number of modes of operation may be larger than two, and the two modes of operation described here are merely examples, and not to be construed as the only implementation of the above disclosure. In some aspects, the number of modes of operation may depend on the number of panels/subarrays and digital baseband chains deployed at the UE 115-*a*. The capability or profile information may be conveyed via capability reporting, RRC signaling, UCI, or MAC-CE signaling.

In some cases, the base station 105-*a* may select a mode of operation, for example, based on the UE capability report, and indicate the same to the UE 115-*a* via downlink signaling. In some cases, the downlink signaling may include RRC, MAC-CE, or DCI signaling. In other cases, the UE 115-*a* may select a mode of operation and notify the base station 105-*a* via uplink signaling (e.g., UCI). In some cases, the mode of operation may be selected based on a predetermined event (e.g., a periodically occurring measurement gap to measure neighboring base station 105-*b*).

Figure 3A:
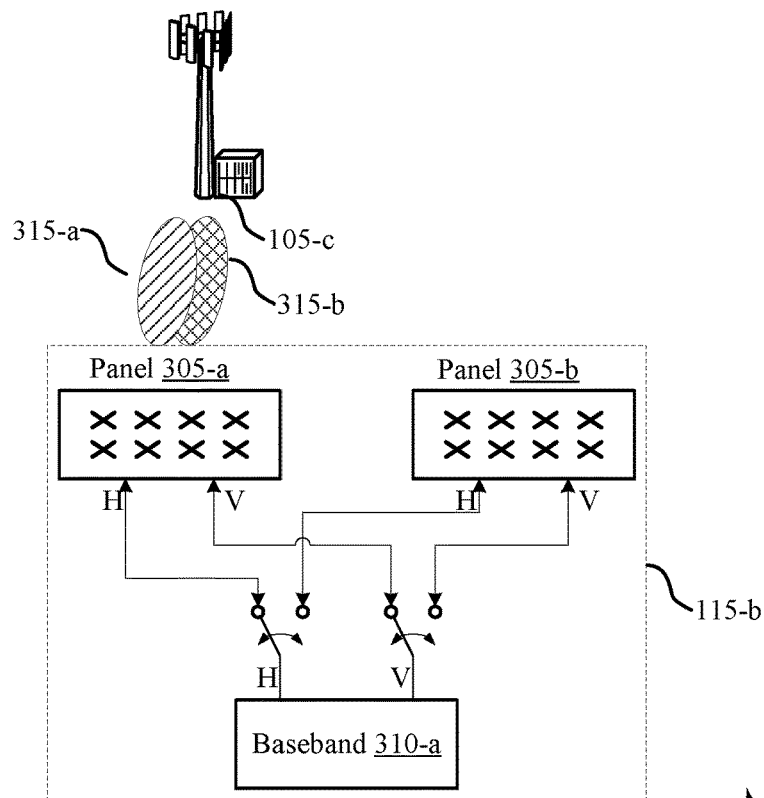
FIGS. 3A and 3B illustrate examples of different modes of operation in accordance with aspects of the present disclosure.
Figure 3B:
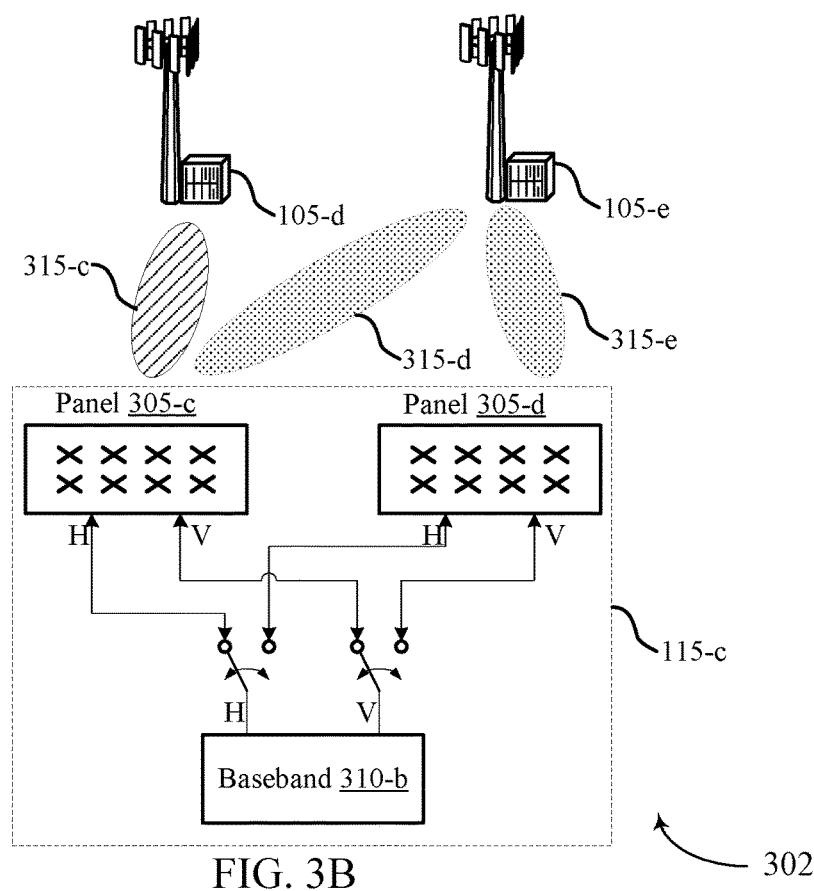

FIGS. 3A and 3B illustrate examples of different modes of operation 300 that support outer-loop link adaptation with multiple offset parameters in accordance with various aspects of the present disclosure. Modes of operation 301 and 302 may be selected by a UE 115 (e.g., UE 115-*b*, UE 115-*c*), a base station 105 (e.g., base station 105-*c*, base station 105-*d*), or may be predetermined (e.g., preconfigured for the UE 115-*b* and 115-*c*). UEs 115-*b* and 115-*c*, and base stations 105-*c* to 105-*e* may be examples of a UE 115 and a base station 105 as described with reference to FIGS. 1 and 2, and may operate in mmW spectrum.

In some cases, UEs 115-*b* and 115-*c*, and base stations 105-*c* to 105-*e*, may utilize hybrid beamforming techniques to increase the strength of wireless signals in particular directions to address the additional attenuation. For instance, hybrid beamforming techniques may allow beamforming to be partitioned between the digital and RF domains. In some cases, an antenna panel 305 may be composed of multiple antenna elements. In hybrid beamforming, those antenna elements, also referred to as RF chains, may be combined or split in the analog domain, and connected to a smaller set of IF/BB chains in the digital domain. In some cases, the multiple antenna elements may be combined into subarray modules, and each element within the subarray may have a phase shift applied directly in the RF domain. Further, digital beamforming and/or precoding techniques may be applied to the signals feeding each subarray.

In some cases, a wireless device such as a UE 115 may include multiple antenna panels 305. In some cases, while operating in high frequencies (e.g., mmW spectrum), propagation characteristics of signals may be highly directional and vulnerable to blocking. In such cases, deploying multiple antenna panels 305 pointed in different directions may serve to optimize robustness of communications. However, due to hardware constraints and/or implementation complexity, all of the antenna panels 305 may not be simultaneously activated. In such cases, a subset may be selected, and baseband chains may be routed and switched to the selected subarrays under certain hardware constraints.

Mode of operation 301 may be an example of a reference mode (or mode 0), e.g., when UE 115-*b* receives data through two chains from an antenna panel 305 (e.g., antenna panel 305-*a*). As illustrated, base station 105-*c* may be in communication with UE 115-*b* using directional beams 315-*a* and 315-*b*. In some cases, base station 105-*c* may be referred to as the serving cell. Further, UE 115-*b* may include two antenna panels 305-*a* and 305-*b*, each having one or more interface ports (e.g., horizontal (H) and vertical (V) polarization ports). In some cases, the one or more digital chains (e.g., H-chain and V-chain) from baseband unit 310-*a* may be connected to the analog front-end. For instance, the H-chain and V-chain may be connected to the H-polarization port and V-polarization port of antenna panel 305-*a*, respectively. Thus, base station 105-*c* may utilize offset parameter Δ (0) and an acquired CQI while scheduling downlink transmissions. Further, Δ (0) may be trained (or updated) by an OLLA algorithm based on HARQ feedbacks received from the UE 115-b. In some other cases, multiple CSIs may be measured at the UE 115-b based on different beam/panel reception hypotheses (i.e., different modes of operation). For instance, CSI measured for different hypotheses may be assigned to different CSI processes. Thus, CSI measured for the reference mode (mode 0) may be assigned to a first CSI process, and base station 105-c may utilize the CSI report corresponding to the reference mode of operation for scheduling of downlink data transmissions.

Mode of operation 302 may be an example of a mode relative to the reference mode. In some cases, mode of operation 302 may allow for increased path diversity and/or robustness. In some cases, base station 105-d may be referred to as the serving cell, and base station 105-e may be referred to as the neighboring cell. Further, UE 115-c may include two antenna panels 305-c and 305-d, each having one or more interface ports (e.g., horizontal (H) and vertical (V) polarization ports). In some cases, UE 115-c may include a baseband unit 310-b, and the one or more digital chains (e.g., H-chain and V-chain) from baseband unit 310-b may be connected to the analog front-end. For instance, the H-chain and V-chain may be connected to the H-polarization port and V-polarization port of panel 305-c, or, the H-chain and V-chain may be connected to the H-polarization port of panel 305-c and V-polarization port of panel 305-d, respectively. As illustrated, one chain (e.g., H-chain) may be utilized by the UE 115-c for data reception from the serving base station 105-d, while the other chain (e.g., V-chain) may be utilized by the UE 115-c for monitoring neighboring base station 105-e. In some cases, UE 115-c may utilize panel 305-d and beam 315-d for monitoring neighboring base station 105-e. In other cases, UE 115-c may monitor neighboring base station 105-e using beam 315-e and panel 305-d. In some cases, base station 105-d may utilize Δ (0)+Δ (1), and an acquired CQI while scheduling downlink transmissions. Further, similar to the case for Δ (0), Δ (1) may be trained (or updated) by an OLLA algorithm based on HARQ feedbacks received from the UE 115-c. In some other cases, multiple CSIs may be measured at the UE 115-c based on different beam/panel reception hypotheses (i.e., different modes of operation). For instance, CSI measured for different hypotheses may be assigned to different CSI processes. Thus, CSI measured for mode 1 may be assigned to a second CSI process, different from the first CSI process, and base station 105-d may utilize the CSI report corresponding to the current mode of operation for scheduling of downlink data transmissions.

Figure 4:
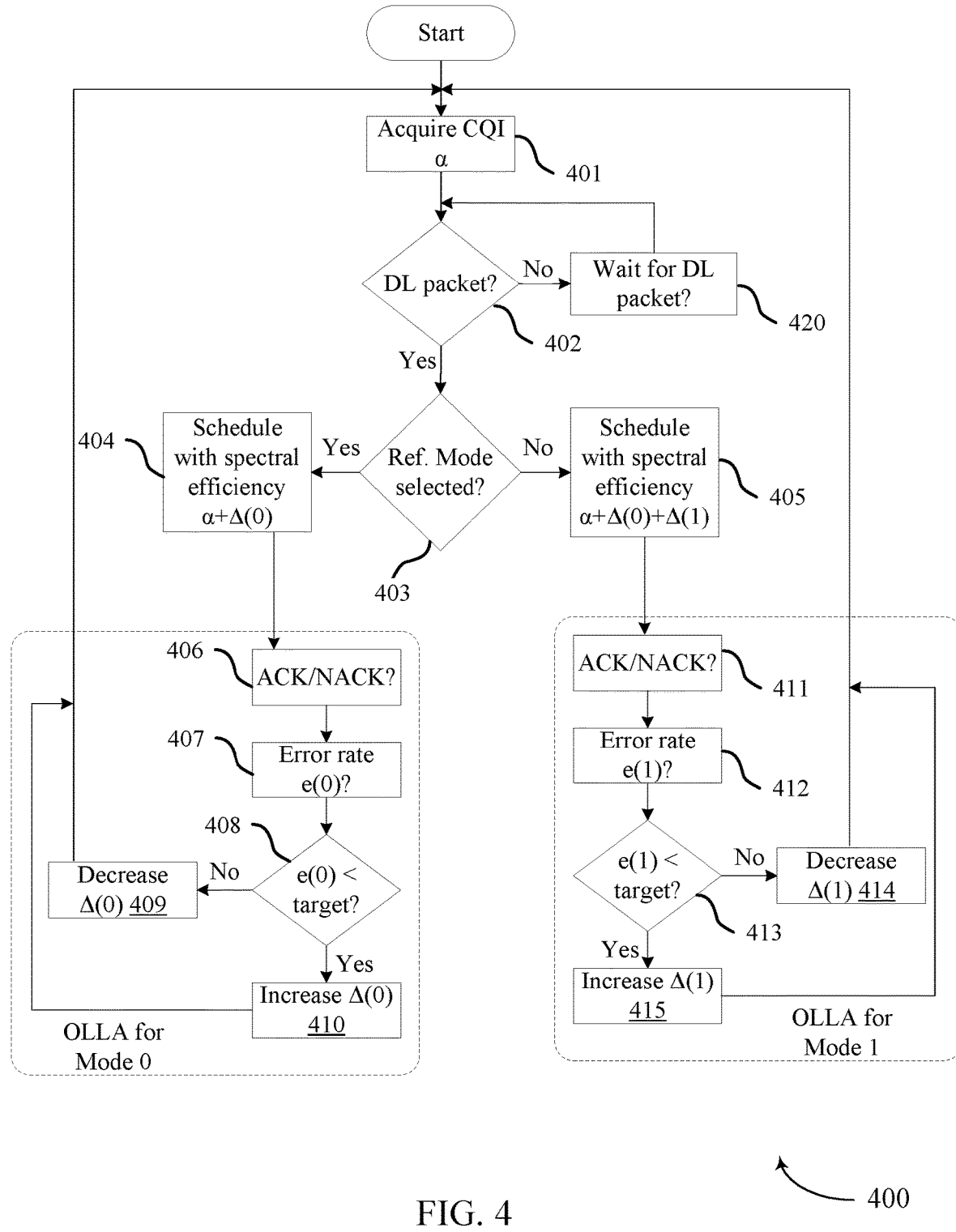
FIG. 4 illustrates an example of a flowchart in accordance with aspects of the present disclosure.

FIG. 4 illustrates an example of a flowchart 400 that supports outer-loop link adaptation with multiple offset parameters in accordance with various aspects of the present disclosure. In some examples, flowchart 400 may implement aspects of wireless communication system 100. Flowchart 400 illustrates base station 105 and UE 115 behavior while performing outer-loop link adaptation. Base station and UE 115 may be examples of a base station 105 and a UE 115, as described with reference to FIGS. 1 and 2.

At 401, a base station 105, also referred to as a serving cell, may acquire CQI (a) from a UE 115. In some aspects, the CQI may be acquired based on CSI feedback received from the UE 115. Alternatively, the CQI may be measured by the base station 105 if channel reciprocity holds.

At 402, the base station 105 may determine if one or more downlink data packets have arrived for transmission, from upper layers. If yes, the base station 105 may proceed to 403 to determine if the reference mode of operation has been selected. If no, the base station 105 may wait for one or more downlink data packets to arrive at 420. In some cases, the UE 115 may transmit a UE capability report, indicating the modes of operation supported by the UE 115 (not shown). For instance, the UE 115 may indicate that it supports both a reference mode (e.g., mode 0) and a different mode (e.g., mode 1) of operation. As previously described, mode 0 may refer to the case when the UE 115 receives data or control information using two chains, whereas mode 1 may refer to the case when the UE 115 receives data/control information using a single chain. In some aspects, the number of modes of operation may depend on the number of panels/subarrays and digital baseband chains deployed at the UE 115. That is, each mode of operation may correspond to a reception configuration using one or more of multiple antenna panels of the UE 115, and one or more of multiple digital baseband chains of the UE 115. In some cases, the network or base station 105 may select a mode of operation, and indicate the same to the UE 115 via downlink signaling. In some cases, the downlink signaling may comprise control information, such as RRC, MAC-CE, or DCI. In some other cases, the UE 115 may select a mode of operation and notify the network or base station 105 via uplink signaling (e.g., UCI). In some cases, the mode of operation may be selected based on a predetermined event (e.g., periodically occurring measurement gaps to measure a neighboring cell).

In some cases, the network or base station 105 may define multiple offset parameters Δ (i), and assign them to each possible mode of beam/panel operations. For instance, Δ (0) may refer to the offset parameter for the reference (e.g., mode 0) mode of operation, Δ (1) may be associated with the different mode (e.g., mode 1) of operation, etc. In some cases, Δ (0) may be the offset between the CQI and the actual scheduled spectral efficiency that can achieve the target performance (e.g., BLER) in the reference mode of operation. In some cases, Δ (1) may be a relative offset to the reference scenario.

If the reference mode is selected, the base station 105 may proceed to schedule downlink data transmissions to the UE 115 with spectral efficiency α+Δ(0), at 404. However, if mode 1 is selected, the base station 105 may schedule downlink data transmissions to the UE 115 with spectral efficiency α+Δ(0)+Δ(1), at 405.

Following scheduling downlink data transmissions for either mode 0 or mode 1, the base station 105 may monitor for acknowledgement/non-acknowledgement from the UE 115, at 406 or 411, respectively. If the base station does not receive an ACK at 406 or 411 (e.g., the base station receives a NACK or no acknowledgement feedback message), the base station may perform a HARQ retransmission process (not shown). For example, the base station may retransmit information for the code block(s) if a NACK is received and continue with the next code block(s) if an ACK is received.

At 407 or 412, the base station 105 may calculate an error rate (e.g., e(0) or e(1)), based in part on the ACK/NACK received. For instance, the error rate may be a BLER, which may be defined as the ratio of the number of incorrectly decoded code blocks to the total number of transmitted code blocks. The error rate may be calculated, for example, as a running average of number of NACKs received to total transmissions. In some cases, at 408 or 413, the base station 105 may compare the calculated error rate to a target error rate. If the calculated error rate, e(0) or e(1) is less than the target error rate, the base station 105 may proceed to increase Δ(0) or Δ(1) at 419 or 415, respectively. In some cases, the base station may identify that the calculated error rate exceeds the target error rate. In such cases, the base station 105 may decrease Δ(0) at 409 or 414, and repeat the process starting from 401. The HARQ retransmission process may use the updated Δ(0) or Δ(1) values for retransmissions.

Figure 5:
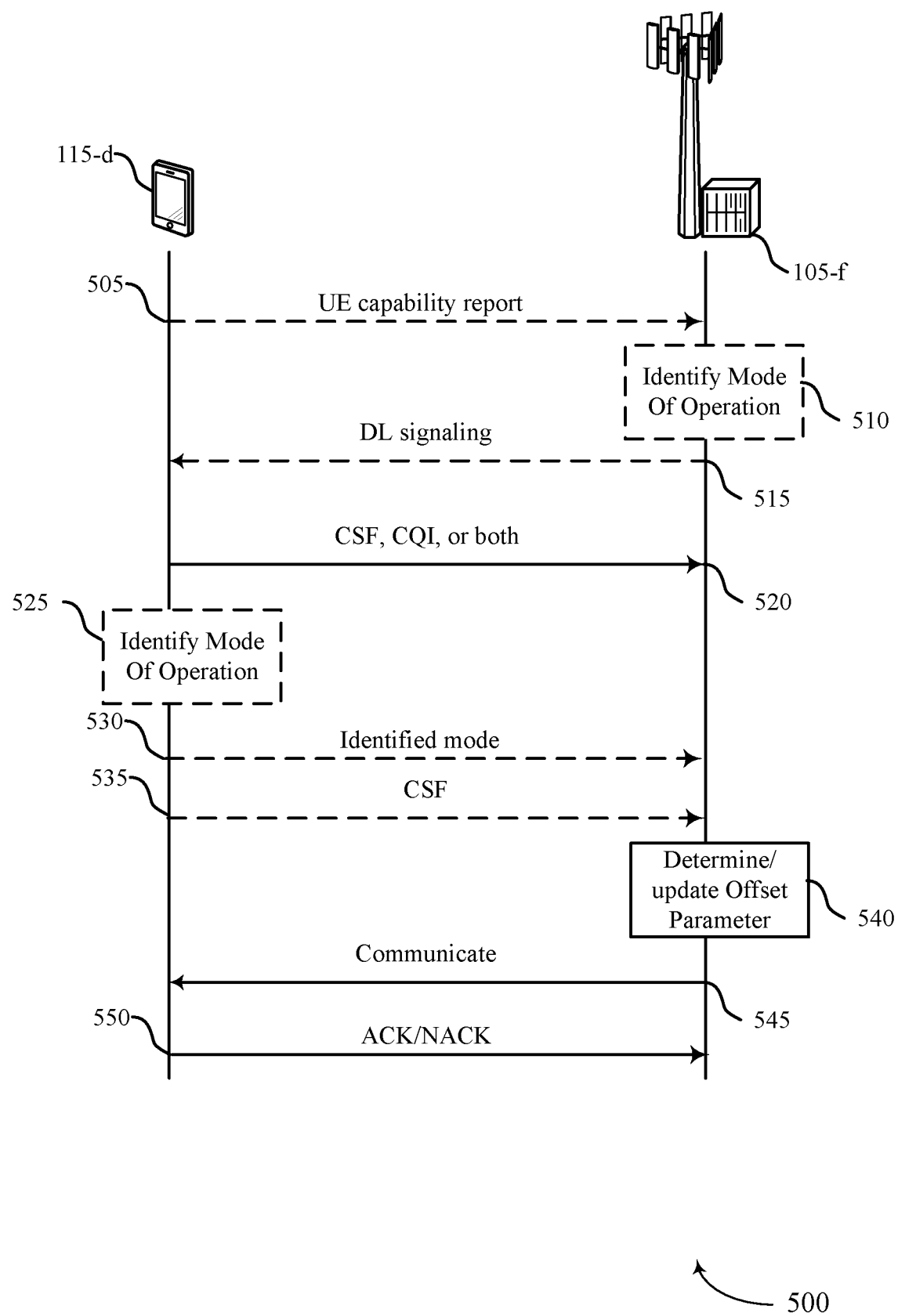
FIG. 5 illustrates an example of a process flow in accordance with aspects of the present disclosure.

FIG. 5 illustrates an example of a process flow 500 that supports outer-loop link adaptation with multiple offset parameters in accordance with various aspects of the present disclosure. In some examples, process flow 500 may implement aspects of wireless communications system 100 and/or 200. Further, process flow 500 may be implemented by a UE 115-d and a base station 105-f, which may be examples of a UE 115 and a base station 105, as described with reference to FIGS. 1, 2, and 3A-B. In some examples, the process illustrated by process flow diagram 500 may be implemented in a wireless communications system operating in mmW spectrum.

At 505, UE 115-d may transmit a UE capability report to base station 105-f, indicating which modes of operation are supported by the UE 115-d, where each of the modes of operation corresponds to a reception configuration using one or more of multiple antenna panels of the UE 115-d and one or more of multiple digital baseband chains of the UE 115-d. For example, modes of operation may be defined for combinations of numbers of antenna panels (e.g., 2, 4, 8) and digital baseband chains (e.g., 2, 4, 8), and the UE 115-d may report which modes are supported via a capability report or bitmap. The capability report may be transmitted via RRC signaling, UCI, or MAC-CE signaling, for example.

In some cases, at 510, base station 105-f may identify a mode of operation based in part on the UE capability report. At 515, base station 105-f may transmit a channel state feedback configuration, the identified (and selected) mode of operation, or both, using downlink signaling. In some cases, the downlink signaling may include control information such as DCI, RRC, or MAC-CE. In some cases, the channel state feedback configuration may associate each of the modes of operation with one of multiple CSI processes.

At 520, the UE 115-d may transmit periodic or aperiodic channel state feedback associated with one or more of the modes of operation. In some cases, the aperiodic CSF may have been triggered one or more slots (e.g., X) before a measurement gap. Further, the UE 115-d may transmit an indication of channel quality to base station 105-f at 520.

In some cases, at 525, UE 115-d may identify a mode of operation, or the mode of operation may be predetermined. For example, measurement gaps to measure a neighboring cell may occur at predetermined intervals. Further, at 530, the UE 115-d may provide an indication of the identified mode of operation to base station 105-f, via uplink signaling. In some cases, at 535, the UE 115-d may measure CSI for the identified mode of operation, and assign the measured CSI to the CSI process associated with the identified mode of operation.

At 540, the base station 105-f may determine or update one or more spectral efficiency offset parameters associated with the selected mode of operation, as further described with reference to FIGS. 2-4. At 545, the base station 105-f may communicate with the UE 115-d based in part on the identified mode of operation and the determined (or updated) spectral efficiency offset parameters.

At 550, the UE 115-d may transmit ACK/NACK feedback based on the transmission from base station 105-f. The base station 105-f may utilize the ACK/NACK feedback to further update the spectral efficiency parameters for the selected mode of operation, as further described with reference to FIGS. 2-4. Updating the spectral efficiency parameters for the selected mode of operation may aid the base station 105-f in achieving a target BLER.

Figure 6:
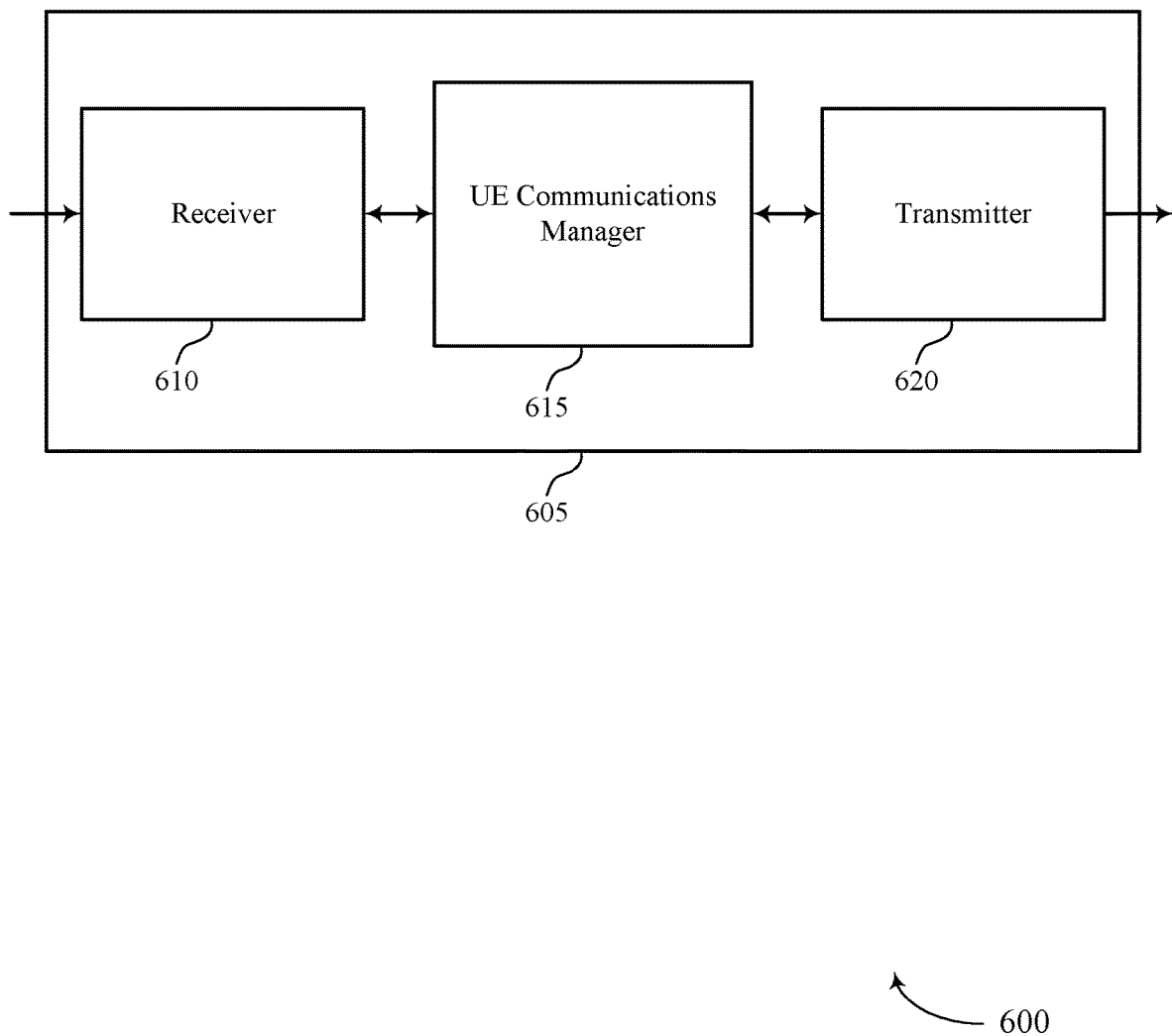
FIGS. 6 through 8 show block diagrams of a device in accordance with aspects of the present disclosure.

FIG. 6 shows a block diagram 600 of a wireless device 605 that supports outer-loop link adaptation with multiple offset parameters in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to outer-loop link adaptation with multiple offset parameters, etc.). Information may be passed on to other components of the device. The receiver 610 may be an example of aspects of the transceiver 935 described with reference to FIG. 9. The receiver 610 may utilize a single antenna or a set of antennas.

Receiver 610 may communicate with the base station based in part on an identified mode of operation. In some cases, the communicating includes receiving a downlink data transmission from the base station.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may transmit, to a base station, a UE capability report, where the UE capability report provides an indication of a set of modes of operation supported by the UE, each of the set of modes of operation corresponding to a reception configuration using one or more of a set of antenna panels of the UE and one or more of a set of digital baseband chains of the UE. In some cases, the UE communications manager 615 may identify a mode of operation from the set of modes of operation for communicating with the base station.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
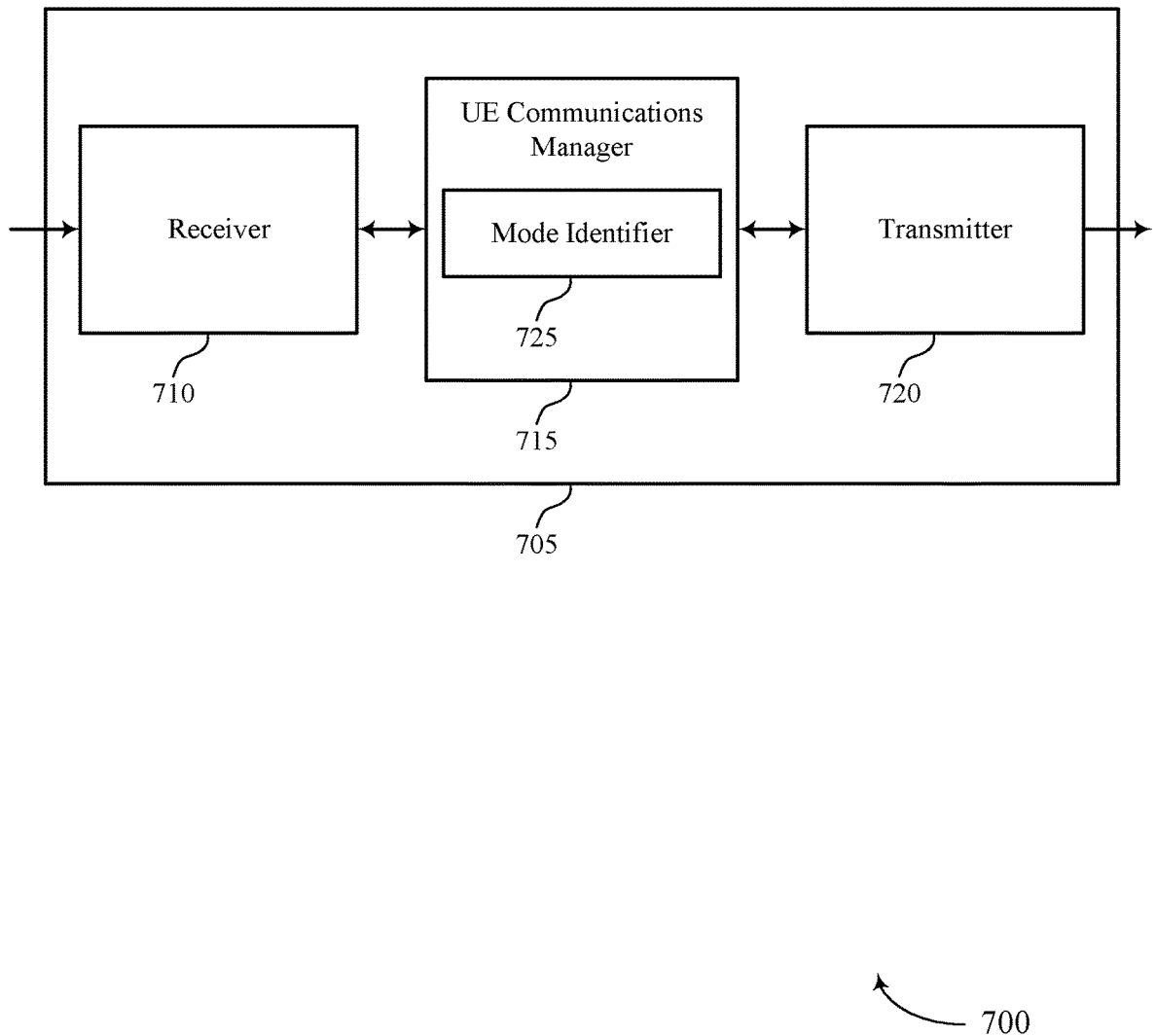

FIG. 7 shows a block diagram 700 of a wireless device 705 that supports outer-loop link adaptation with multiple offset parameters in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to outer-loop link adaptation with multiple offset parameters, etc.). Information may be passed on to other components of the device. The receiver 710 may be an example of aspects of the transceiver 935 described with reference to FIG. 9. The receiver 710 may utilize a single antenna or a set of antennas. The receiver 710 may include, for example, one or more baseband units 310 as described with reference to FIGS. 3A and 3B.

UE communications manager 715 may be an example of aspects of the UE communications manager 915 described with reference to FIG. 9. UE communications manager 715 may also include mode identifier 725.

Mode identifier 725 may transmit, to a base station, a UE capability report, where the UE capability report provides an indication of a set of modes of operation supported by the UE, each of the set of modes of operation corresponding to a reception configuration using one or more of a set of antenna panels of the UE and one or more of a set of digital baseband chains of the UE. Mode identifier 725 may identify a mode of operation from the set of modes of operation for communicating with the base station. In some cases, identifying the mode of operation from the set of modes of operation is based on receiving, from the base station, control information, the control information based in part on the UE capability report. In some cases, identifying the mode of operation from the set of modes of operation is based on identifying a predetermined event corresponding to the identified mode of operation, or based on a power state of the UE. For example, the power state of the UE may be indicated (e.g., in UE assistance information) to the base station to provide additional information for the determination of the mode of operation. In some cases, the control information is one or more of DCI, a RRC message, or a MAC-CE.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
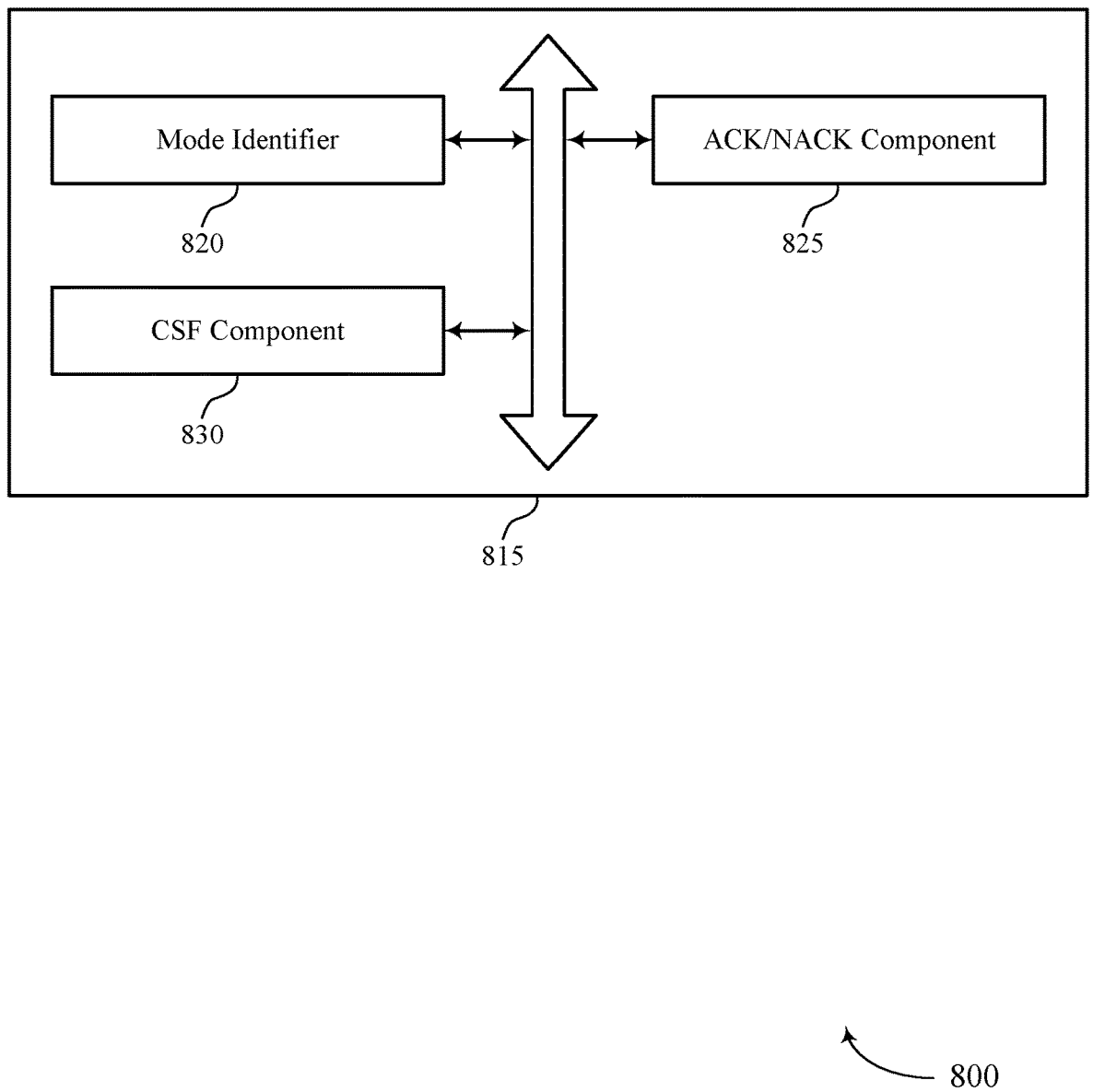

FIG. 8 shows a block diagram 800 of a UE communications manager 815 that supports outer-loop link adaptation with multiple offset parameters in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include mode identifier 820, acknowledgement (ACK)/negative acknowledgement (NACK) component 825, and CSF component 830. Each of these modules may communicate, directly or indirectly, with one another (e.g., via one or more buses).

Mode identifier 820 may transmit, to a base station, a UE capability report, where the UE capability report provides an indication of a set of modes of operation supported by the UE, each of the set of modes of operation corresponding to a reception configuration using one or more of a set of antenna panels of the UE and one or more of a set of digital baseband chains of the UE. In some cases, mode identifier 820 may identify a mode of operation from the set of modes of operation for communicating with the base station, where identifying the mode of operation from the set of modes of operation is based on receiving, from the base station, control information, the control information based in part on the UE capability report, or identifying a predetermined event corresponding to the identified mode of operation, or on a power state of the UE. For example, the power state of the UE may be indicated (e.g., in UE assistance information) to the base station to provide additional information for the determination of the mode of operation. In some cases, the control information is one or more of DCI, a RRC message, or a MAC-CE.

ACK/NACK component 825 may transmit, to the base station, acknowledgement/not-acknowledgement feedback for the downlink data transmission.

CSF component 830 may transmit periodic or aperiodic channel state feedback associated with one or more of the set of modes of operation and receive a channel state feedback configuration associating each of the set of modes of operation with one of a set of CSI processes. In some cases, the transmitting the periodic or aperiodic channel state feedback includes measuring CSI for the identified mode of operation and assigning the measured CSI to the CSI process associated with the identified mode of operation.

Figure 9:
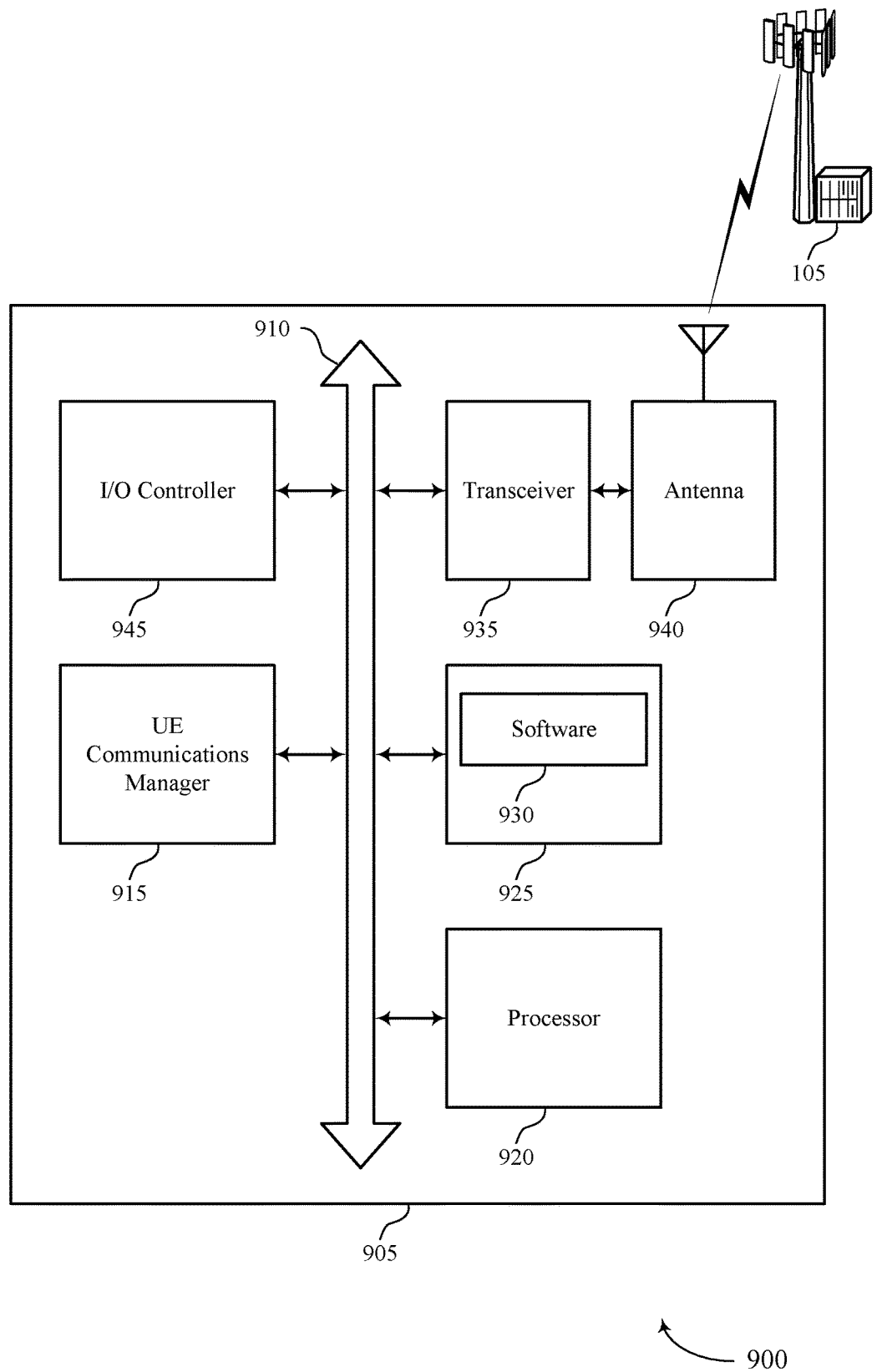
FIG. 9 illustrates a block diagram of a system including a UE in accordance with aspects of the present disclosure.

FIG. 9 shows a diagram of a system 900 including a device 905 that supports outer-loop link adaptation with multiple offset parameters in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting outer-loop link adaptation with multiple offset parameters).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support outer-loop link adaptation with multiple offset parameters. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
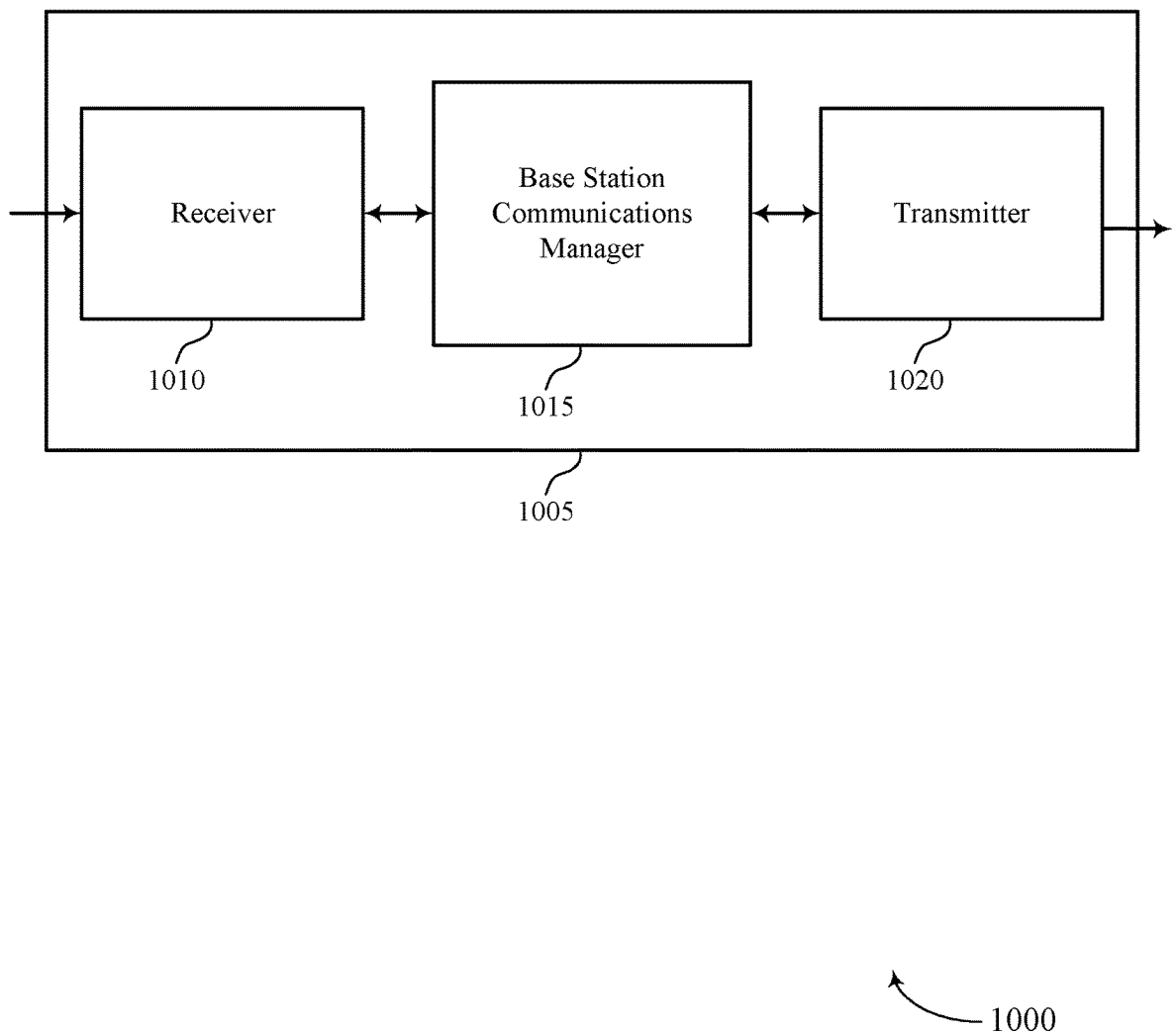
FIGS. 10 through 12 show block diagrams of a device in accordance with aspects of the present disclosure.

FIG. 10 shows a block diagram 1000 of a wireless device 1005 that supports outer-loop link adaptation with multiple offset parameters in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to outer-loop link adaptation with multiple offset parameters, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may receive, from a UE, a UE capability report, where the UE capability report provides an indication of a set of modes of operation supported by the UE, receive, from the UE, an indication of channel quality, determine spectral efficiency offset parameters for each of the set of modes of operation based on the received UE capability report, the indicated channel quality, or a combination thereof, identify a mode of operation from the set of modes of operation for communicating with the UE, and communicate with the UE based on the identified mode of operation and the determined spectral efficiency offset parameters.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas. In some cases, transmitter 1020 may communicate with the UE based on the identified mode of operation and the determined spectral efficiency offset parameters, where communicating with the UE includes scheduling a data transmission, indicating a CSI process, or both.

Figure 11:
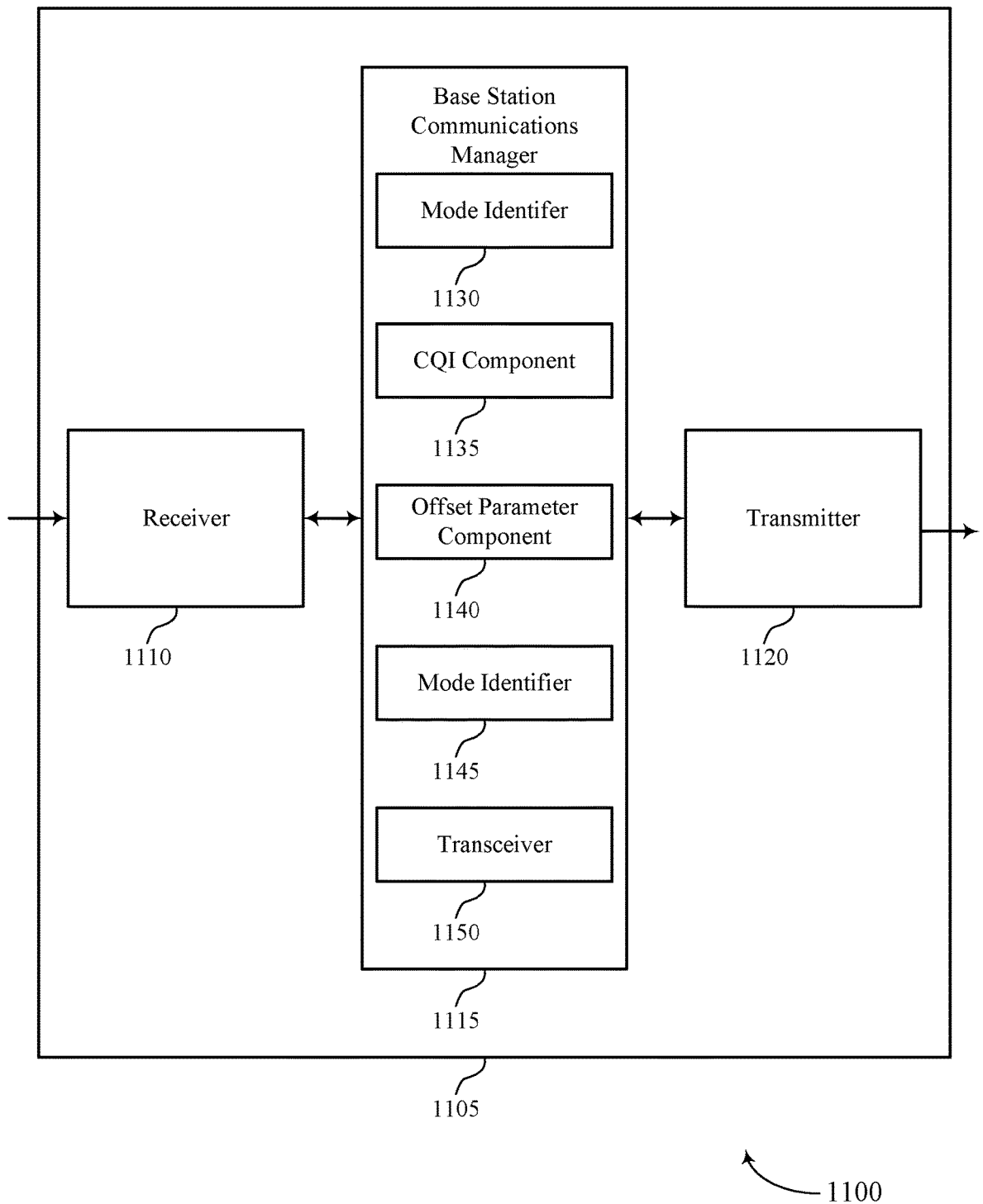

FIG. 11 shows a block diagram 1100 of a wireless device 1105 that supports outer-loop link adaptation with multiple offset parameters in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to outer-loop link adaptation with multiple offset parameters, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include mode identifier 1130, channel quality information (CQI) component 1135, offset parameter component 1140, mode identifier 1145, and transceiver 1150.

Mode identifier 1130 may receive, from a UE, a UE capability report, where the UE capability report provides an indication of a set of modes of operation supported by the UE. CQI component 1135 may receive, from the UE, an indication of channel quality.

Offset parameter component 1140 may determine spectral efficiency offset parameters for each of the set of modes of operation based on the received UE capability report, the indicated channel quality, or a combination thereof, and update the spectral efficiency offset parameter for the identified mode of operation based on the acknowledgement/not-acknowledgement feedback. In some cases, the reference mode of operation is associated with a first spectral efficiency offset parameter, where the first spectral efficiency offset parameter is a difference between an acquired CQI and a target performance spectral efficiency for the reference mode of operation. In some cases, the second mode of operation is associated with a second spectral efficiency offset parameter, where spectral efficiency in the second mode of operation is based on the first spectral efficiency offset parameter and the second spectral efficiency offset parameter.

Mode identifier 1145 may identify a mode of operation from the set of modes of operation for communicating with the UE. In some cases, the set of modes of operation correspond to reception configurations for the communicating using one or more of a set of antenna panels of the UE and one or more of a set of digital baseband chains of the UE. In some cases, the set of modes of operation includes at least a first reference mode of operation and a second mode of operation.

Transceiver 1150 may communicate with the UE based on the identified mode of operation and the determined spectral efficiency offset parameters, where communicating with the UE includes scheduling a data transmission, indicating a CSI process, or both.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
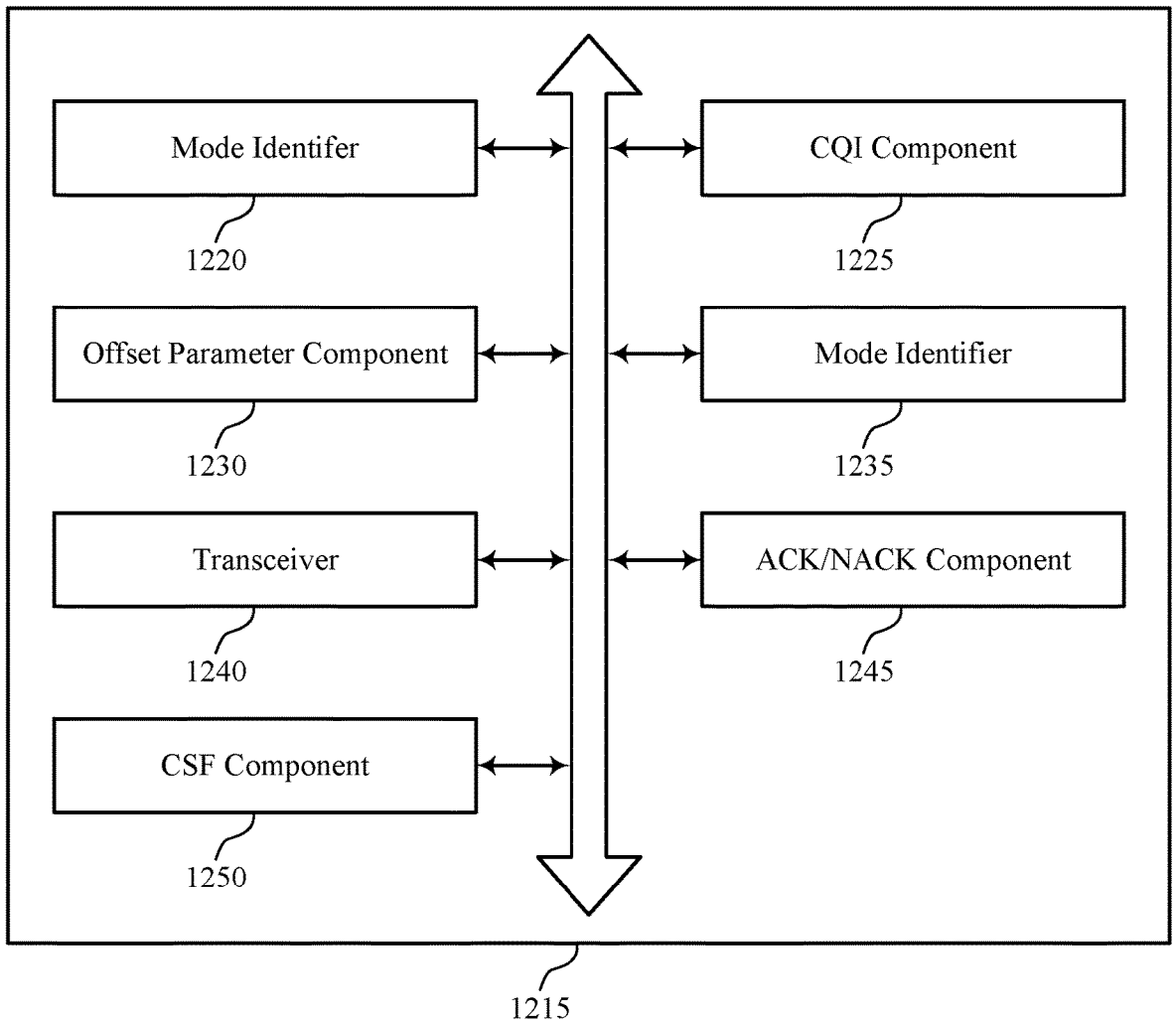

FIG. 12 shows a block diagram 1200 of a base station communications manager 1215 that supports outer-loop link adaptation with multiple offset parameters in accordance with aspects of the present disclosure. The base station communications manager 1215 may be an example of aspects of a base station communications manager 1315 described with reference to FIGS. 10, 11, and 13. The base station communications manager 1215 may include mode identifier 1220, CQI component 1225, offset parameter component 1230, mode identifier 1235, transceiver 1240, ACK/NACK component 1245, and CSF component 1250. Each of these modules may communicate, directly or indirectly, with one another (e.g., via one or more buses).

Mode identifier 1220 may receive, from a UE, a UE capability report, where the UE capability report provides an indication of a set of modes of operation supported by the UE. CQI component 1225 may receive, from the UE, an indication of channel quality.

Offset parameter component 1230 may determine spectral efficiency offset parameters for each of the set of modes of operation based on the received UE capability report, the indicated channel quality, or a combination thereof. In some cases, the offset parameter component 1230 may update the spectral efficiency offset parameter for the identified mode of operation based on the acknowledgement/not-acknowledgement feedback. In some cases, the reference mode of operation is associated with a first spectral efficiency offset parameter, where the first spectral efficiency offset parameter is a difference between an acquired CQI and a target performance spectral efficiency for the reference mode of operation. In some cases, the second mode of operation is associated with a second spectral efficiency offset parameter, where spectral efficiency in the second mode of operation is based on the first spectral efficiency offset parameter and the second spectral efficiency offset parameter.

Mode identifier 1235 may identify a mode of operation from the set of modes of operation for communicating with the UE. In some cases, the set of modes of operation correspond to reception configurations for the communicating using one or more of a set of antenna panels of the UE and one or more of a set of digital baseband chains of the UE. In some cases, the set of modes of operation includes at least a first reference mode of operation and a second mode of operation.

Transceiver 1240 may communicate with the UE based on the identified mode of operation and the determined spectral efficiency offset parameters where communicating with the UE includes scheduling a data transmission, indicating a CSI process, or both.

ACK/NACK component 1245 may receive, from the UE, acknowledgement/not-acknowledgement feedback associated with the communicating. CSF component 1250 may receive, from the UE, a CSI feedback for the identified mode of operation. In some cases, scheduling the data transmission for the identified mode of operation further includes transmitting downlink data to the UE based in part on the received CSI feedback for the identified mode of operation.

Figure 13:
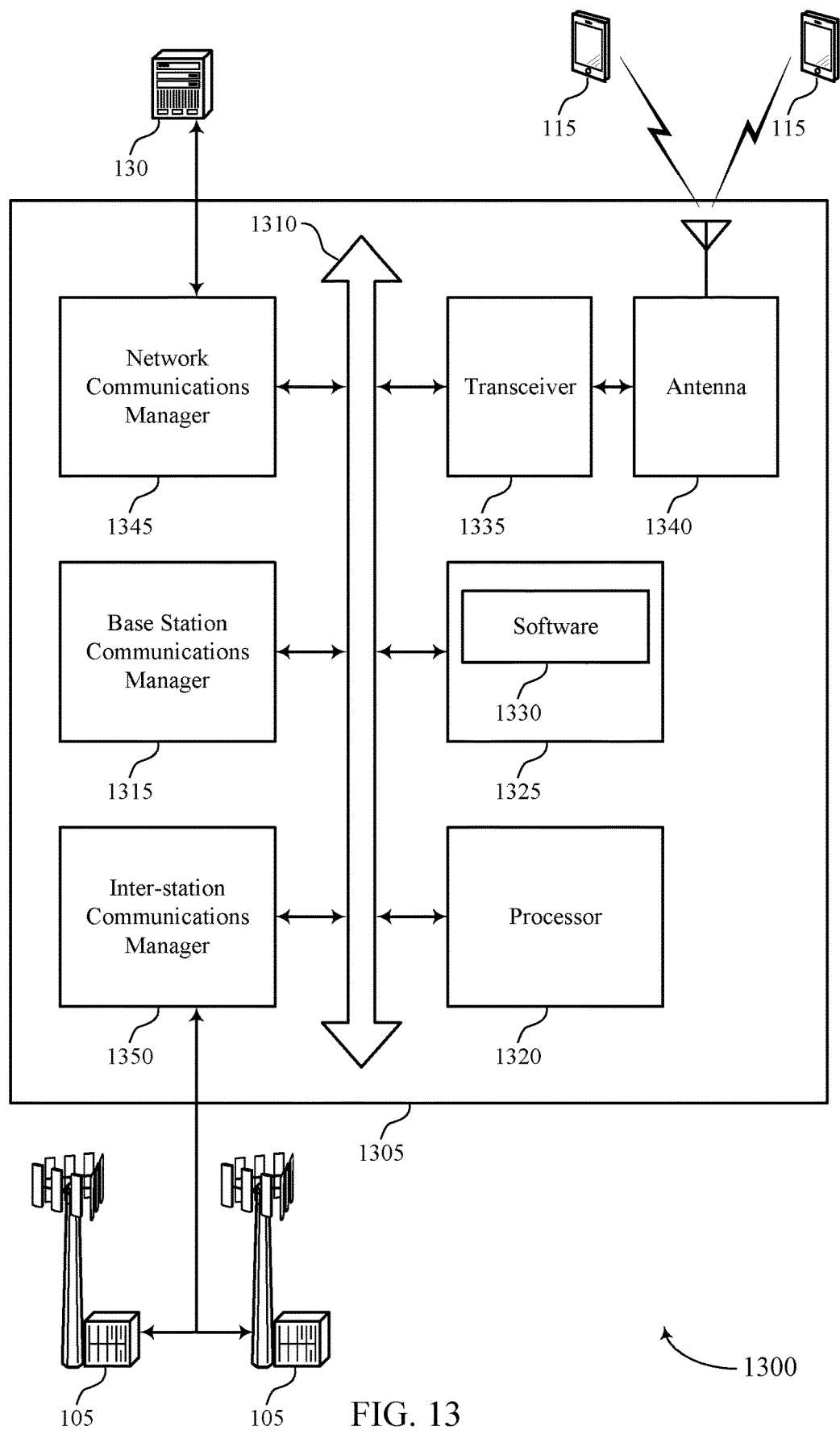
FIG. 13 illustrates a block diagram of a system including a base in accordance with aspects of the present disclosure.

FIG. 13 shows a diagram of a system 1300 including a device 1305 that supports outer-loop link adaptation with multiple offset parameters in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting outer-loop link adaptation with multiple offset parameters).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support outer-loop link adaptation with multiple offset parameters. Software 1330 may be stored in a non-transitory computer-readable medium such as system memory or other memory. In some cases, the software 1330 may not be directly executable by the processor but may cause a computer (e.g., when compiled and executed) to perform functions described herein.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
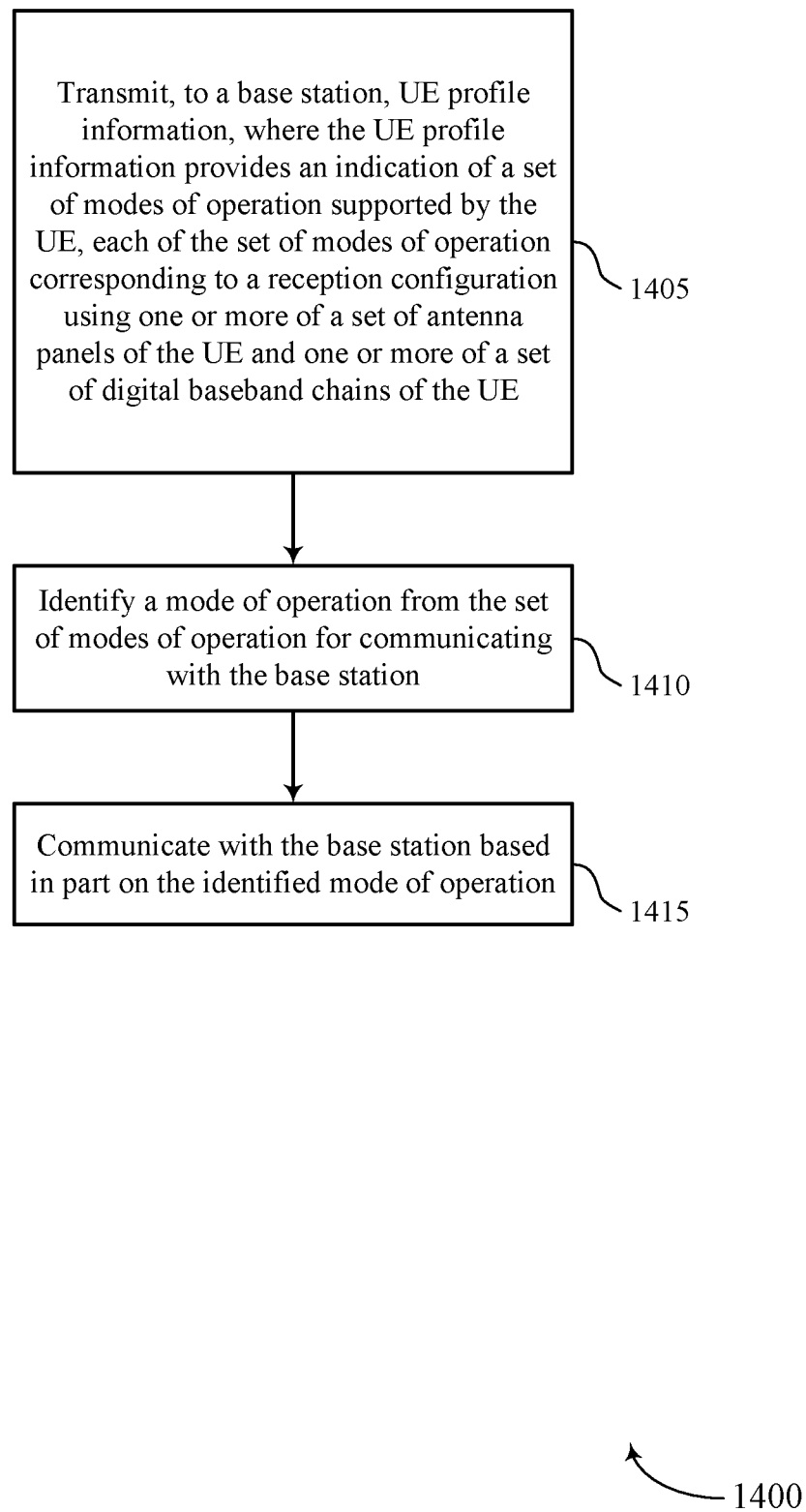
FIGS. 14 through 15 illustrate methods in accordance with aspects of the present disclosure.

FIG. 14 shows a flowchart illustrating a method 1400 for outer-loop link adaptation with multiple offset parameters in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1405, the UE 115 may transmit, to a base station, UE profile information, where the UE profile information provides an indication of a plurality of modes of operation supported by the UE, each of the plurality of modes of operation corresponding to a reception configuration using one or more of a plurality of antenna panels of the UE and one or more of a plurality of digital baseband chains of the UE. The UE profile information may be transmitted via a capability report, RRC signaling, UCI, or MAC-CE signaling, for example. The operations of 1405 may be performed according to the methods described herein. In certain examples, aspects of the operations of 1405 may be performed by a mode identifier as described with reference to FIGS. 6 through 9.

At 1410, the UE 115 may identify a mode of operation from the plurality of modes of operation for communicating with the base station. The operations of 1410 may be performed according to the methods described herein. In certain examples, aspects of the operations of 1410 may be performed by a mode identifier as described with reference to FIGS. 6 through 9.

At 1415, the UE 115 may communicate with the base station based in part on the identified mode of operation. The operations of 1415 may be performed according to the methods described herein. In certain examples, aspects of the operations of 1415 may be performed by a receiver as described with reference to FIGS. 6 through 9.

Figure 15:
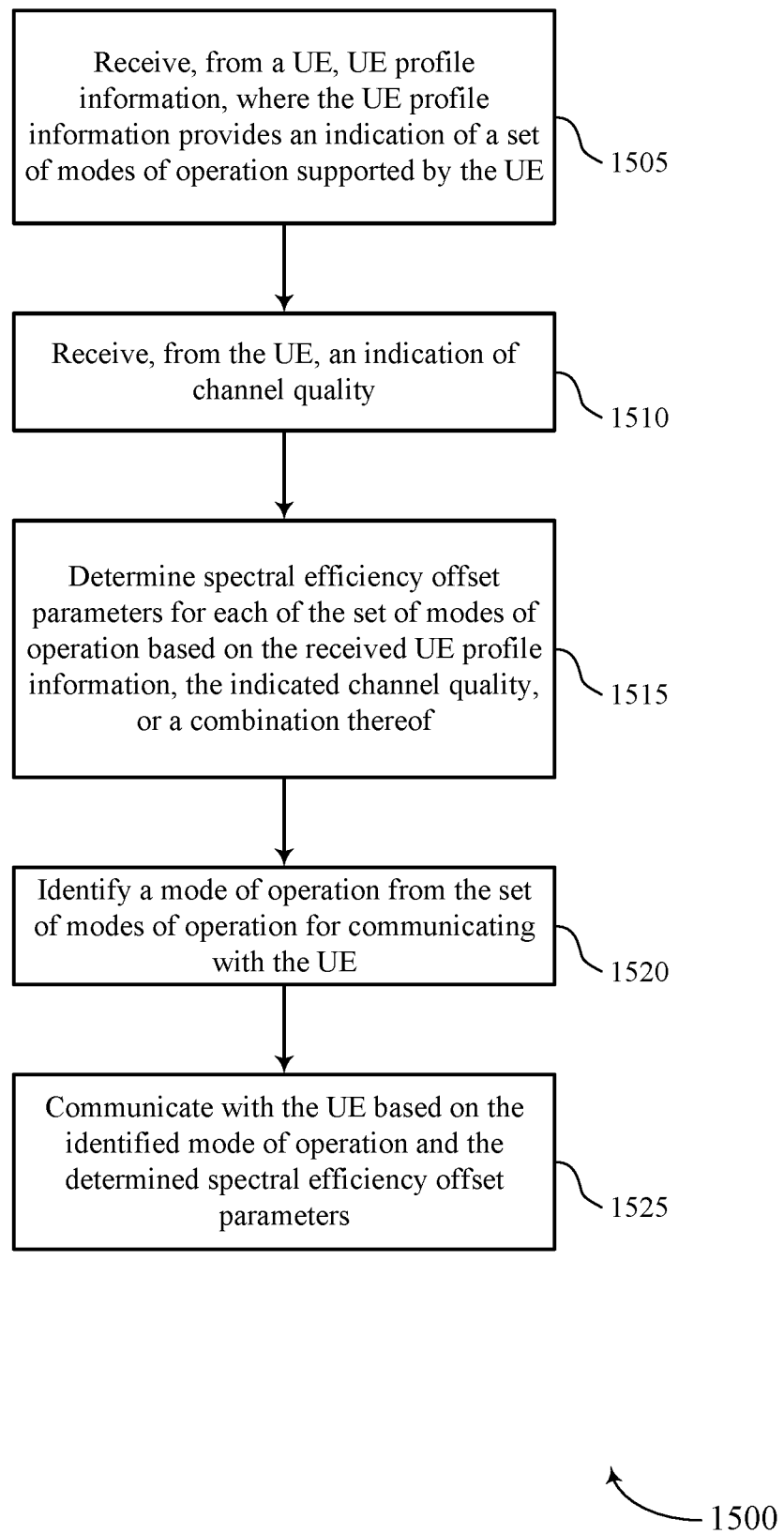

FIG. 15 shows a flowchart illustrating a method 1500 for outer-loop link adaptation with multiple offset parameters in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1505, the base station 105 may receive, from a UE, UE profile information, where the UE profile information provides an indication of a plurality of modes of operation supported by the UE. The UE profile information may be received via a capability report, RRC signaling, UCI, or MAC-CE signaling, for example. The operations of 1505 may be performed according to the methods described herein. In certain examples, aspects of the operations of 1505 may be performed by a mode identifier as described with reference to FIGS. 10 through 13.

At 1510, the base station 105 may receive, from the UE, an indication of channel quality. The operations of 1510 may be performed according to the methods described herein. In certain examples, aspects of the operations of 1510 may be performed by a CQI component as described with reference to FIGS. 10 through 13.

At 1515, the base station 105 may determine spectral efficiency offset parameters for each of the plurality of modes of operation based at least in part on the received UE profile information, the indicated channel quality, or a combination thereof. The operations of 1515 may be performed according to the methods described herein. In certain examples, aspects of the operations of 1515 may be performed by a offset parameter component as described with reference to FIGS. 10 through 13.

At 1520, the base station 105 may identify a mode of operation from the plurality of modes of operation for communicating with the UE. The operations of 1520 may be performed according to the methods described herein. In certain examples, aspects of the operations of 1520 may be performed by a mode identifier as described with reference to FIGS. 10 through 13.

At 1525, the base station 105 may communicate with the UE based at least in part on the identified mode of operation and the determined spectral efficiency offset parameters. The operations of 1525 may be performed according to the methods described herein. In certain examples, aspects of the operations of 1525 may be performed by a transceiver as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting, to a base station, user equipment (UE) profile information, wherein the UE profile information provides an indication of a plurality of modes of operation supported by the UE, each of the plurality of modes of operation corresponding to a reception configuration using one or more of a plurality of antenna panels of the UE and one or more of a plurality of digital baseband chains of the UE;
   receiving, from the base station, a channel state feedback configuration associating each of the plurality of modes of operation with one of a plurality of channel state information (C SI) processes;
   identifying a mode of operation from the plurality of modes of operation for communicating with the base station; and
   communicating with the base station based in part on the identified mode of operation and a CSI process associated with the mode of operation.

2. The method of claim 1, wherein the communicating comprises receiving a downlink data transmission from the base station.

3. The method of claim 2, further comprising:
   transmitting, to the base station, acknowledgement/not-acknowledgement feedback for the downlink data transmission.

4. The method of claim 1, further comprising:
   transmitting periodic or aperiodic channel state feedback associated with one or more of the plurality of modes of operation.

5. The method of claim 4, wherein the transmitting the periodic or aperiodic channel state feedback comprises measuring CSI for the identified mode of operation and assigning the measured CSI to the CSI process associated with the identified mode of operation.

6. The method of claim 1, wherein identifying the mode of operation from the plurality of modes of operation is based at least in part on receiving, from the base station, control information, the control information based in part on the UE profile information.

7. The method of claim 6, wherein the control information is one or more of downlink control information (DCI), a radio resource control (RRC) message, or a medium access control (MAC)-control element (CE).

8. The method of claim 1, wherein identifying the mode of operation from the plurality of modes of operation is based on identifying a predetermined event corresponding to the identified mode of operation.

9. The method of claim 1, wherein identifying the mode of operation from the plurality of modes of operation is based on a power state of the UE.

10. The method of claim 1, wherein transmitting the UE profile information comprises transmitting UE capability reporting, uplink control information (UCI), radio resource control (RRC) signaling, or medium access control (MAC)-control element (CE) signaling.

11. A method for wireless communication, comprising:
    receiving, from a user equipment (UE), UE profile information, wherein the UE profile information provides an indication of a plurality of modes of operation supported by the UE;
    receiving, from the UE, an indication of channel quality;
    determining spectral efficiency offset parameters for each of the plurality of modes of operation based at least in part on the received UE profile information and the indicated channel quality;
    identifying a mode of operation from the plurality of modes of operation for communicating with the UE; and
    communicating with the UE based at least in part on the identified mode of operation and the determined spectral efficiency offset parameters.

12. The method of claim 11, wherein the plurality of modes of operation correspond to reception configurations for the communicating using one or more of a plurality of antenna panels of the UE and one or more of a plurality of digital baseband chains of the UE.

13. The method of claim 11, wherein the plurality of modes of operation comprises at least a first, reference mode of operation and a second mode of operation.

14. The method of claim 13, wherein the reference mode of operation is associated with a first spectral efficiency offset parameter, and wherein the first spectral efficiency offset parameter is a difference between an acquired channel quality indicator (CQI) and a target performance spectral efficiency for the reference mode of operation.

15. The method of claim 14, wherein the second mode of operation is associated with a second spectral efficiency offset parameter, and wherein spectral efficiency in the second mode of operation is based at least in part on the first spectral efficiency offset parameter and the second spectral efficiency offset parameter.

16. The method of claim 11, wherein communicating with the UE comprises scheduling a data transmission, indicating a channel state information (CSI) process, or both.

17. The method of claim 16, further comprising:
receiving, from the UE, acknowledgement/not-acknowledgement feedback associated with the communicating.

18. The method of claim 17, further comprising:
updating a spectral efficiency offset parameter for the identified mode of operation based at least in part on the acknowledgement/not-acknowledgement feedback.

19. The method of claim 11, further comprising:
receiving, from the UE, UE assistance information for identifying the mode of operation from the plurality of modes of operation or a channel state information (CSI) feedback for the identified mode of operation.

20. The method of claim 19, wherein scheduling a data transmission for the identified mode of operation further comprises:
transmitting downlink data to the UE based in part on the received UE assistance information or CSI feedback for the identified mode of operation.

21. The method of claim 11, wherein receiving the UE profile information comprises receiving UE capability reporting, uplink control information (UCI), radio resource control (RRC) signaling, or medium access control (MAC)-control element (CE) signaling.

22. An apparatus for wireless communication, comprising:
a processor;
memory in electronic communication with the processor; and
instructions stored in the memory and executable by the processor to cause the apparatus to:
transmit, to a base station, user equipment (UE) profile information, wherein the UE profile information provides an indication of a plurality of modes of operation supported by the UE, each of the plurality of modes of operation corresponding to a reception configuration using one or more of a plurality of antenna panels of the UE and one or more of a plurality of digital baseband chains of the UE;
receive, from the base station, a channel state feedback configuration associating each of the plurality of modes of operation with one of a plurality of channel state information (C SI) processes;
identify a mode of operation from the plurality of modes of operation for communicating with the base station; and
communicate with the base station based in part on the identified mode of operation and a CSI process associated with the mode of operation.

23. The apparatus of claim 22, wherein the communicating comprises receiving a downlink data transmission from the base station.

24. The apparatus of claim 23, wherein the instructions are further executable by the processor to cause the apparatus to:
transmit, to the base station, acknowledgement/not-acknowledgement feedback for the downlink data transmission.

25. The apparatus of claim 22, wherein the instructions are further executable by the processor to cause the apparatus to:
transmit periodic or aperiodic channel state feedback associated with one or more of the plurality of modes of operation.

26. The apparatus of claim 25, wherein the transmitting the periodic or aperiodic channel state feedback comprises measuring CSI for the identified mode of operation and assigning the measured CSI to the CSI process associated with the identified mode of operation.

27. An apparatus for wireless communication, comprising:
a processor;
memory in electronic communication with the processor; and
instructions stored in the memory and executable by the processor to cause the apparatus to:
receive, from a user equipment (UE), UE profile information, wherein the UE profile information provides an indication of a plurality of modes of operation supported by the UE;
receive, from the UE, an indication of channel quality;
determine spectral efficiency offset parameters for each of the plurality of modes of operation based at least in part on the received UE profile information and the indicated channel quality;
identify a mode of operation from the plurality of modes of operation for communicating with the UE; and
communicate with the UE based at least in part on the identified mode of operation and the determined spectral efficiency offset parameters.

28. The apparatus of claim 27, wherein the plurality of modes of operation correspond to reception configurations for the communicating using one or more of a plurality of antenna panels of the UE and one or more of a plurality of digital baseband chains of the UE.

* * * * *